US012750408B2

(12) United States Patent
Straub et al.

(10) Patent No.: US 12,750,408 B2
(45) Date of Patent: Sep. 29, 2026

(54) APPARATUS AND METHODS FOR CENTRALIZED MESSAGE EXCHANGE IN A USER PREMISES DEVICE

(71) Applicant: TIME WARNER CABLE ENTERPRISES LLC, St. Louis, MO (US)

(72) Inventors: Albert Straub, Westminster, CO (US); John Chen, Ashburn, VA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 38 days.

(21) Appl. No.: 18/532,753

(22) Filed: Dec. 7, 2023

(65) Prior Publication Data

US 2024/0106868 A1 Mar. 28, 2024

Related U.S. Application Data

(60) Continuation of application No. 17/675,408, filed on Feb. 18, 2022, now Pat. No. 11,843,641, which is a
(Continued)

(51) Int. Cl.
*H04L 65/102* (2022.01)
*H04L 65/611* (2022.01)
(Continued)

(52) U.S. Cl.
CPC .......... *H04L 65/102* (2013.01); *H04L 65/611* (2022.05); *H04L 65/612* (2022.05);
(Continued)

(58) Field of Classification Search
CPC ... H04L 65/102; H04L 65/611; H04L 65/612; H04L 67/02; H04L 67/145; H04L 67/289;
(Continued)

(56) References Cited

U.S. PATENT DOCUMENTS 5,410,344 A 4/1995 Graves et al.
5,528,284 A 6/1996 Iwami et al.
(Continued)

FOREIGN PATENT DOCUMENTS

EP 1821459 A1 8/2007
EP 2081361 A1 7/2009
(Continued)

OTHER PUBLICATIONS

Alcatel., "Delivering True Triple Play—Common Capabilities for the Delivery of Composite Services", Internet Citation, Jun. 2006 (2006-06), XP002418653, Retrieved from the Internet: URL: http://www.alcatel-lucent.com/tripleplay [retrieved on Feb. 6, 2007].
(Continued)

*Primary Examiner* — David R Lazaro
(74) *Attorney, Agent, or Firm* — Patent Beach PC

(57) ABSTRACT

Methods and apparatus for providing a messaging server within a premises device e.g., a home or enterprise gateway device. In one embodiment, a system is described that includes a premises device that acts as a centralized client messaging platform providing messaging services between a content provider and client devices, and also between client devices within a premises network. The premises device enables client-to-client communication that bypasses the long trip and propagation delay over the Internet by connecting the message across the premises network within the home or building. The premises device enables messages to be communicated between a content provider outside the premises network and the client devices via a single connection to minimize the number of Internet connections that need to be opened, and the number of messages communicated with servers outside of the premises network via both upstream aggregation and downstream dis-aggregation,
(Continued)

which collectively save both network bandwidth and device reaction time.

20 Claims, 19 Drawing Sheets

Related U.S. Application Data division of application No. 16/557,619, filed on Aug. 30, 2019, now Pat. No. 11,258,832, which is a division of application No. 15/055,205, filed on Feb. 26, 2016, now Pat. No. 10,404,758.

(51) Int. Cl.

| | |
|---|---|
| ***H04L 65/612*** | (2022.01) |
| ***H04L 67/02*** | (2022.01) |
| ***H04L 67/145*** | (2022.01) |
| ***H04L 67/289*** | (2022.01) |
| ***H04L 67/568*** | (2022.01) |
| *H04L 65/1066* | (2022.01) |
| *H04L 65/4061* | (2022.01) |
| *H04L 67/12* | (2022.01) |

(52) U.S. Cl.

CPC ............ *H04L 67/02* (2013.01); *H04L 67/145* (2013.01); *H04L 67/289* (2013.01); *H04L 67/568* (2022.05); *H04L 65/1066* (2013.01); *H04L 65/4061* (2013.01); *H04L 67/12* (2013.01)

(58) Field of Classification Search

CPC ............... H04L 67/568; H04L 65/1066; H04L 65/4061; H04L 67/12

See application file for complete search history.

(56) References Cited

U.S. PATENT DOCUMENTS

| | | | |
|---|---|---|---|
| 5,534,911 | A | 7/1996 | Levitan |
| 5,557,319 | A | 9/1996 | Gurusami et al. |
| 5,628,284 | A | 5/1997 | Sheen et al. |
| 5,708,961 | A | 1/1998 | Hylton et al. |
| 5,745,837 | A | 4/1998 | Fuhrmann |
| 5,758,257 | A | 5/1998 | Herz et al. |
| 5,818,438 | A | 10/1998 | Howe et al. |
| 5,822,530 | A | 10/1998 | Brown |
| 5,838,921 | A | 11/1998 | Speeter |
| 5,897,635 | A | 4/1999 | Torres et al. |
| 5,940,738 | A | 8/1999 | Rao |
| 5,999,535 | A | 12/1999 | Wang et al. |
| 6,125,397 | A | 9/2000 | Yoshimura et al. |
| 6,167,432 | A | 12/2000 | Jiang |
| 6,181,697 | B1 | 1/2001 | Nurenberg et al. |
| 6,219,710 | B1 | 4/2001 | Gray et al. |
| 6,233,389 | B1 | 5/2001 | Barton et al. |
| 6,259,701 | B1 | 7/2001 | Shur et al. |
| 6,286,049 | B1 | 9/2001 | Rajakarunanayake et al. |
| 6,317,884 | B1 | 11/2001 | Eames et al. |
| 6,345,038 | B1 | 2/2002 | Selinger |
| 6,389,538 | B1 | 5/2002 | Gruse et al. |
| 6,396,531 | B1 | 5/2002 | Gerszberg et al. |
| 6,473,793 | B1 | 10/2002 | Dillon et al. |
| 6,519,062 | B1 | 2/2003 | Yoo |
| 6,523,696 | B1 | 2/2003 | Saito et al. |
| 6,546,016 | B1 | 4/2003 | Gerszberg et al. |
| 6,564,381 | B1 | 5/2003 | Hodge et al. |
| 6,640,145 | B2 | 10/2003 | Hoffberg et al. |
| 6,642,938 | B1 | 11/2003 | Gilboy |
| 6,642,939 | B1 | 11/2003 | Vallone et al. |
| 6,643,262 | B1 | 11/2003 | Larsson et al. |
| 6,672,961 | B1 | 1/2004 | Uzun |
| 6,678,004 | B1 * | 1/2004 | Schultheiss ...... H04N 21/43637 725/80 |
| 6,694,145 | B2 | 2/2004 | Riikonen et al. |
| 6,711,742 | B1 | 3/2004 | Kishi et al. |
| 6,718,552 | B1 | 4/2004 | Goode |
| 6,748,395 | B1 | 6/2004 | Picker et al. |
| 6,754,904 | B1 | 6/2004 | Cooper et al. |
| 6,757,906 | B1 | 6/2004 | Look et al. |
| 6,758,746 | B1 | 7/2004 | Hunter et al. |
| 6,774,926 | B1 | 8/2004 | Ellis et al. |
| 6,788,676 | B2 | 9/2004 | Partanen et al. |
| 6,847,778 | B1 | 1/2005 | Vallone et al. |
| 6,865,746 | B1 | 3/2005 | Herrington et al. |
| 6,909,726 | B1 | 6/2005 | Sheeran |
| 6,918,131 | B1 | 7/2005 | Rautila et al. |
| 6,925,257 | B2 | 8/2005 | Yoo |
| 6,931,018 | B1 | 8/2005 | Fisher |
| 6,934,964 | B1 | 8/2005 | Schaffer et al. |
| 6,944,150 | B1 | 9/2005 | McConnell et al. |
| 6,978,474 | B1 | 12/2005 | Sheppard et al. |
| 7,003,670 | B2 | 2/2006 | Heaven et al. |
| 7,006,881 | B1 | 2/2006 | Hoffberg et al. |
| 7,009,972 | B2 | 3/2006 | Maher et al. |
| 7,013,290 | B2 | 3/2006 | Ananian |
| 7,020,652 | B2 | 3/2006 | Matz et al. |
| 7,027,460 | B2 | 4/2006 | Iyer et al. |
| 7,039,048 | B1 | 5/2006 | Monta et al. |
| 7,051,352 | B1 | 5/2006 | Schaffer |
| 7,054,902 | B2 | 5/2006 | Toporek et al. |
| 7,055,031 | B2 | 5/2006 | Platt |
| 7,055,165 | B2 | 5/2006 | Connelly |
| 7,068,639 | B1 | 6/2006 | Varma et al. |
| 7,096,483 | B2 | 8/2006 | Johnson |
| 7,099,308 | B2 | 8/2006 | Merrill et al. |
| 7,100,183 | B2 | 8/2006 | Kunkel et al. |
| 7,103,905 | B2 | 9/2006 | Novak |
| 7,106,382 | B2 | 9/2006 | Shiotsu |
| 7,136,866 | B2 | 11/2006 | Springer et al. |
| 7,146,627 | B1 | 12/2006 | Ismail et al. |
| 7,149,772 | B1 | 12/2006 | Kalavade |
| 7,154,901 | B2 | 12/2006 | Chava et al. |
| 7,167,895 | B1 | 1/2007 | Connelly |
| 7,174,126 | B2 | 2/2007 | McElhatten et al. |
| 7,174,127 | B2 | 2/2007 | Otten et al. |
| 7,174,385 | B2 | 2/2007 | Li |
| 7,185,355 | B1 | 2/2007 | Ellis et al. |
| 7,206,775 | B2 | 4/2007 | Kaiser et al. |
| 7,207,055 | B1 | 4/2007 | Hendricks et al. |
| 7,209,458 | B2 | 4/2007 | Ahvonen et al. |
| 7,213,036 | B2 | 5/2007 | Apparao et al. |
| 7,228,556 | B2 | 6/2007 | Beach et al. |
| 7,242,960 | B2 | 7/2007 | Van Rooyen |
| 7,242,988 | B1 | 7/2007 | Hoffberg et al. |
| 7,254,608 | B2 | 8/2007 | Yeager et al. |
| 7,257,106 | B2 | 8/2007 | Chen et al. |
| 7,260,823 | B2 | 8/2007 | Schlack et al. |
| 7,266,726 | B1 | 9/2007 | Ladd et al. |
| 7,293,276 | B2 | 11/2007 | Phillips et al. |
| 7,312,391 | B2 | 12/2007 | Kaiser et al. |
| 7,325,043 | B1 | 1/2008 | Rosenberg et al. |
| 7,325,073 | B2 | 1/2008 | Shao et al. |
| 7,330,483 | B1 | 2/2008 | Peters, Jr. et al. |
| 7,330,510 | B2 | 2/2008 | Castillo et al. |
| 7,333,483 | B2 | 2/2008 | Zhao et al. |
| 7,336,787 | B2 | 2/2008 | Unger et al. |
| 7,337,458 | B2 | 2/2008 | Michelitsch et al. |
| 7,340,762 | B2 | 3/2008 | Kim |
| 7,343,398 | B1 | 3/2008 | Lownsbrough |
| 7,359,375 | B2 | 4/2008 | Lipsanen et al. |
| 7,363,643 | B2 | 4/2008 | Drake et al. |
| 7,376,386 | B2 | 5/2008 | Phillips et al. |
| 7,382,786 | B2 | 6/2008 | Chen et al. |
| 7,404,082 | B2 | 7/2008 | Medvinsky et al. |
| 7,406,515 | B1 | 7/2008 | Joyce et al. |
| 7,444,655 | B2 | 10/2008 | Sardera |
| 7,457,520 | B2 | 11/2008 | Rosetti et al. |
| 7,486,869 | B2 | 2/2009 | Alexander et al. |
| 7,487,523 | B1 | 2/2009 | Hendricks |
| 7,532,712 | B2 | 5/2009 | Gonder et al. |

(56) References Cited

U.S. PATENT DOCUMENTS

| | | | |
|---|---|---|---|
| 7,548,562 B2 | 6/2009 | Ward et al. | |
| 7,567,983 B2 | 7/2009 | Pickelsimer et al. | |
| 7,571,452 B2 | 8/2009 | Gutta | |
| 7,592,912 B2 | 9/2009 | Hasek et al. | |
| 7,602,820 B2 | 10/2009 | Helms et al. | |
| 7,603,469 B2 | 10/2009 | Fletcher et al. | |
| 7,609,637 B2 | 10/2009 | Doshi et al. | |
| 7,624,337 B2 | 11/2009 | Sull et al. | |
| 7,624,415 B1 * | 11/2009 | Zhang | H04N 21/26616 725/86 |
| 7,650,319 B2 | 1/2010 | Hoffberg et al. | |
| 7,690,020 B2 | 3/2010 | Lebar | |
| 7,693,171 B2 | 4/2010 | Gould | |
| 7,721,314 B2 | 5/2010 | Sincaglia et al. | |
| 7,725,553 B2 | 5/2010 | Rang et al. | |
| 7,742,074 B2 | 6/2010 | Minatogawa | |
| 7,770,200 B2 | 8/2010 | Brooks et al. | |
| 7,809,942 B2 | 10/2010 | Baran et al. | |
| 7,870,245 B2 | 1/2011 | Butler | |
| 7,893,171 B2 | 2/2011 | Le et al. | |
| 7,900,052 B2 | 3/2011 | Jonas et al. | |
| 7,908,626 B2 | 3/2011 | Williamson et al. | |
| 7,916,755 B2 | 3/2011 | Hasek et al. | |
| 7,936,775 B2 | 5/2011 | Iwamura | |
| 7,954,131 B2 | 5/2011 | Cholas et al. | |
| 8,024,762 B2 | 9/2011 | Britt | |
| 8,042,054 B2 | 10/2011 | White et al. | |
| 8,095,610 B2 | 1/2012 | Gould et al. | |
| 8,166,126 B2 | 4/2012 | Bristow et al. | |
| 8,170,065 B2 | 5/2012 | Hasek et al. | |
| 8,219,134 B2 | 7/2012 | Maharajh et al. | |
| 8,249,497 B2 | 8/2012 | Ingrassia et al. | |
| 8,281,352 B2 | 10/2012 | Brooks et al. | |
| 8,302,111 B2 | 10/2012 | Ladd et al. | |
| 8,341,242 B2 | 12/2012 | Dillon et al. | |
| 8,347,341 B2 | 1/2013 | Markley et al. | |
| 8,429,702 B2 | 4/2013 | Yasrebi et al. | |
| 8,484,511 B2 | 7/2013 | Engel et al. | |
| 8,516,529 B2 | 8/2013 | Lajoie et al. | |
| 8,520,850 B2 | 8/2013 | Helms et al. | |
| 8,583,758 B2 | 11/2013 | Casey et al. | |
| 8,732,854 B2 * | 5/2014 | Cholas | H04L 67/51 725/111 |
| 8,738,607 B2 | 5/2014 | Dettinger et al. | |
| 8,750,490 B2 | 6/2014 | Murtagh et al. | |
| 8,750,909 B2 | 6/2014 | Fan et al. | |
| 8,805,270 B2 | 8/2014 | Maharajh et al. | |
| 8,843,622 B1 * | 9/2014 | Graham | H04L 67/54 709/224 |
| 8,910,218 B2 * | 12/2014 | Tirasirikul | H04N 21/4751 725/100 |
| 8,949,919 B2 | 2/2015 | Cholas et al. | |
| 8,995,815 B2 | 3/2015 | Maharajh et al. | |
| 9,083,513 B2 | 7/2015 | Helms et al. | |
| 9,124,608 B2 | 9/2015 | Jin et al. | |
| 9,124,650 B2 | 9/2015 | Maharajh et al. | |
| 9,215,423 B2 | 12/2015 | Kimble et al. | |
| 9,258,608 B2 | 2/2016 | Dillon et al. | |
| 9,357,247 B2 | 5/2016 | Cronk et al. | |
| 9,742,851 B2 * | 8/2017 | Petersson | H04L 65/1026 |
| 9,906,838 B2 | 2/2018 | Cronk et al. | |
| 10,136,172 B2 | 11/2018 | Cronk et al. | |
| 10,404,758 B2 * | 9/2019 | Straub | H04L 67/02 |
| 10,887,650 B2 * | 1/2021 | Wilson | H04L 12/2807 |
| 11,258,832 B2 * | 2/2022 | Straub | H04L 65/611 |
| 11,343,554 B2 | 5/2022 | Cronk et al. | |
| 11,843,641 B2 * | 12/2023 | Straub | H04L 67/568 |
| 2001/0004768 A1 | 6/2001 | Hodge et al. | |
| 2001/0043613 A1 | 11/2001 | Wibowo et al. | |
| 2001/0050945 A1 | 12/2001 | Lindsey | |
| 2002/0002688 A1 | 1/2002 | Gregg et al. | |
| 2002/0024943 A1 | 2/2002 | Karaul et al. | |
| 2002/0027883 A1 | 3/2002 | Belaiche | |
| 2002/0032754 A1 | 3/2002 | Logston et al. | |
| 2002/0042921 A1 | 4/2002 | Ellis | |
| 2002/0053076 A1 | 5/2002 | Landesmann | |
| 2002/0056125 A1 | 5/2002 | Hodge et al. | |
| 2002/0059218 A1 | 5/2002 | August et al. | |
| 2002/0059619 A1 | 5/2002 | Lebar | |
| 2002/0066033 A1 | 5/2002 | Dobbins et al. | |
| 2002/0083451 A1 | 6/2002 | Gill et al. | |
| 2002/0087995 A1 | 7/2002 | Pedlow et al. | |
| 2002/0095689 A1 | 7/2002 | Novak | |
| 2002/0123931 A1 | 9/2002 | Splaver et al. | |
| 2002/0131511 A1 | 9/2002 | Zenoni | |
| 2002/0144267 A1 | 10/2002 | Gutta et al. | |
| 2002/0147771 A1 | 10/2002 | Traversat et al. | |
| 2002/0152091 A1 | 10/2002 | Nagaoka et al. | |
| 2002/0152299 A1 | 10/2002 | Traversat et al. | |
| 2002/0178444 A1 | 11/2002 | Trajkovic et al. | |
| 2002/0188744 A1 | 12/2002 | Mani | |
| 2002/0188869 A1 | 12/2002 | Patrick | |
| 2002/0194595 A1 | 12/2002 | Miller et al. | |
| 2003/0005453 A1 | 1/2003 | Rodriguez et al. | |
| 2003/0012190 A1 | 1/2003 | Kaku et al. | |
| 2003/0028451 A1 | 2/2003 | Ananian | |
| 2003/0056217 A1 | 3/2003 | Brooks | |
| 2003/0065623 A1 | 4/2003 | Corneil et al. | |
| 2003/0093794 A1 | 5/2003 | Thomas et al. | |
| 2003/0097574 A1 | 5/2003 | Upton | |
| 2003/0115267 A1 | 6/2003 | Hinton et al. | |
| 2003/0135628 A1 | 7/2003 | Fletcher et al. | |
| 2003/0163443 A1 | 8/2003 | Wang | |
| 2003/0165241 A1 | 9/2003 | Fransdonk | |
| 2003/0166401 A1 | 9/2003 | Combes et al. | |
| 2003/0200548 A1 | 10/2003 | Baran et al. | |
| 2003/0208767 A1 | 11/2003 | Williamson et al. | |
| 2003/0217137 A1 | 11/2003 | Roese et al. | |
| 2003/0217365 A1 | 11/2003 | Caputo | |
| 2003/0220100 A1 | 11/2003 | McElhatten et al. | |
| 2004/0034677 A1 | 2/2004 | Davey et al. | |
| 2004/0034877 A1 | 2/2004 | Nogues | |
| 2004/0045032 A1 | 3/2004 | Cummings et al. | |
| 2004/0045035 A1 | 3/2004 | Cummings et al. | |
| 2004/0045037 A1 | 3/2004 | Cummings et al. | |
| 2004/0117254 A1 | 6/2004 | Nemirofsky et al. | |
| 2004/0133923 A1 | 7/2004 | Watson et al. | |
| 2004/0137918 A1 | 7/2004 | Varonen et al. | |
| 2004/0166832 A1 | 8/2004 | Portman et al. | |
| 2004/0230994 A1 | 11/2004 | Urdang et al. | |
| 2004/0250273 A1 | 12/2004 | Swix et al. | |
| 2005/0034171 A1 | 2/2005 | Benya | |
| 2005/0044223 A1 | 2/2005 | Meyerson | |
| 2005/0049886 A1 | 3/2005 | Grannan et al. | |
| 2005/0055220 A1 | 3/2005 | Lee et al. | |
| 2005/0055729 A1 | 3/2005 | Atad et al. | |
| 2005/0066353 A1 | 3/2005 | Fransdonk | |
| 2005/0083921 A1 | 4/2005 | McDermott, III et al. | |
| 2005/0086334 A1 | 4/2005 | Aaltonen et al. | |
| 2005/0086683 A1 | 4/2005 | Meyerson | |
| 2005/0108763 A1 | 5/2005 | Baran et al. | |
| 2005/0114701 A1 | 5/2005 | Atkins et al. | |
| 2005/0114900 A1 | 5/2005 | Ladd et al. | |
| 2005/0130585 A1 | 6/2005 | Gnuschke et al. | |
| 2005/0138193 A1 | 6/2005 | Encarnacion et al. | |
| 2005/0157731 A1 | 7/2005 | Peters | |
| 2005/0165899 A1 | 7/2005 | Mazzola | |
| 2005/0177855 A1 | 8/2005 | Maynard et al. | |
| 2005/0188415 A1 | 8/2005 | Riley | |
| 2005/0223097 A1 | 10/2005 | Ramsayer et al. | |
| 2005/0228725 A1 | 10/2005 | Rao et al. | |
| 2005/0259645 A1 * | 11/2005 | Chen | H04L 67/63 370/389 |
| 2005/0289616 A1 | 12/2005 | Horiuchi et al. | |
| 2005/0289618 A1 | 12/2005 | Hardin | |
| 2006/0020786 A1 | 1/2006 | Helms et al. | |
| 2006/0021004 A1 | 1/2006 | Moran et al. | |
| 2006/0021019 A1 | 1/2006 | Hinton et al. | |
| 2006/0041905 A1 | 2/2006 | Wasilewski | |
| 2006/0041915 A1 | 2/2006 | Dimitrova et al. | |
| 2006/0047957 A1 | 3/2006 | Helms et al. | |
| 2006/0053463 A1 | 3/2006 | Choi | |
| 2006/0088030 A1 | 4/2006 | Beeson et al. | |
| 2006/0095940 A1 | 5/2006 | Yearwood | |

(56) References Cited

U.S. PATENT DOCUMENTS

2006/0117379 A1 6/2006 Bennett et al.
2006/0130099 A1 6/2006 Rooyen
2006/0130101 A1 6/2006 Wessel
2006/0130107 A1 6/2006 Gonder et al.
2006/0130113 A1 6/2006 Carlucci et al.
2006/0136964 A1 6/2006 Diez et al.
2006/0136968 A1 6/2006 Han et al.
2006/0149850 A1 7/2006 Bowman
2006/0156392 A1 7/2006 Baugher et al.
2006/0161635 A1 7/2006 Lamkin et al.
2006/0171423 A1 8/2006 Helms et al.
2006/0187900 A1 8/2006 Akbar
2006/0190990 A1 8/2006 Gruper et al.
2006/0206712 A1 9/2006 Dillaway et al.
2006/0209799 A1 9/2006 Gallagher et al.
2006/0218604 A1 9/2006 Riedl et al.
2006/0221246 A1 10/2006 Yoo
2006/0238656 A1 10/2006 Chen et al.
2006/0248553 A1 11/2006 Mikkelson et al.
2006/0259927 A1 11/2006 Acharya et al.
2006/0291506 A1 12/2006 Cain
2007/0019645 A1 1/2007 Menon
2007/0022459 A1 1/2007 Gaebel et al.
2007/0022469 A1 1/2007 Cooper et al.
2007/0025372 A1 2/2007 Brenes et al.
2007/0033531 A1 2/2007 Marsh
2007/0049245 A1 3/2007 Lipman
2007/0053513 A1 3/2007 Hoffberg
2007/0061023 A1 3/2007 Hoffberg et al.
2007/0067851 A1 3/2007 Fernando et al.
2007/0073704 A1 3/2007 Bowden et al.
2007/0076728 A1 4/2007 Rieger et al.
2007/0081537 A1 4/2007 Wheelock
2007/0094691 A1 4/2007 Gazdzinski
2007/0118848 A1 5/2007 Schwesinger et al.
2007/0121578 A1 5/2007 Annadata et al.
2007/0121678 A1 5/2007 Brooks et al.
2007/0124488 A1 5/2007 Baum et al.
2007/0124769 A1 5/2007 Casey et al.
2007/0124781 A1 5/2007 Casey et al.
2007/0150920 A1 6/2007 Lee et al.
2007/0153820 A1 7/2007 Gould
2007/0154041 A1 7/2007 Beauchamp
2007/0157234 A1 7/2007 Walker
2007/0157262 A1 7/2007 Ramaswamy et al.
2007/0169144 A1 7/2007 Chen et al.
2007/0180230 A1 8/2007 Cortez
2007/0204300 A1 8/2007 Markley et al.
2007/0204314 A1 8/2007 Hasek et al.
2007/0209054 A1 9/2007 Cassanova
2007/0209059 A1 9/2007 Moore et al.
2007/0217436 A1 9/2007 Markley et al.
2007/0219910 A1 9/2007 Martinez
2007/0220553 A1 9/2007 Branam et al.
2007/0226365 A1 9/2007 Hildreth et al.
2007/0245376 A1 10/2007 Svendsen
2007/0250880 A1 10/2007 Hainline
2007/0250912 A1 10/2007 Rassool et al.
2007/0261116 A1 11/2007 Prafullchandra et al.
2007/0276925 A1 11/2007 La Joie et al.
2007/0276926 A1 11/2007 LaJoie et al.
2007/0280298 A1 12/2007 Hearn et al.
2007/0288637 A1 12/2007 Layton et al.
2007/0288715 A1 12/2007 Boswell et al.
2007/0294717 A1 12/2007 Hill et al.
2007/0294738 A1 12/2007 Kuo et al.
2007/0299728 A1 12/2007 Nemirofsky et al.
2008/0009345 A1 1/2008 Bailey et al.
2008/0021836 A1 1/2008 Lao
2008/0022012 A1 1/2008 Wang
2008/0059804 A1 3/2008 Shah et al.
2008/0066112 A1 3/2008 Bailey et al.
2008/0086750 A1 4/2008 Yasrebi et al.
2008/0091805 A1 4/2008 Malaby et al.
2008/0091807 A1 4/2008 Strub et al.
2008/0092163 A1 4/2008 Song et al.
2008/0092181 A1 4/2008 Britt
2008/0098089 A1* 4/2008 Luciani ............... H04L 12/1868
709/219
2008/0098212 A1 4/2008 Helms et al.
2008/0098450 A1 4/2008 Wu et al.
2008/0112405 A1 5/2008 Cholas et al.
2008/0133551 A1 6/2008 Wensley et al.
2008/0134165 A1* 6/2008 Anderson .......... H04N 21/4586
717/173
2008/0137541 A1 6/2008 Agarwal et al.
2008/0155059 A1 6/2008 Hardin et al.
2008/0162353 A1 7/2008 Tom et al.
2008/0170530 A1 7/2008 Connors et al.
2008/0170551 A1 7/2008 Zaks
2008/0177998 A1 7/2008 Apsangi et al.
2008/0192820 A1 8/2008 Brooks et al.
2008/0201386 A1 8/2008 Maharajh et al.
2008/0201748 A1 8/2008 Hasek et al.
2008/0222684 A1 9/2008 Mukraj et al.
2008/0235746 A1 9/2008 Peters et al.
2008/0273591 A1 11/2008 Brooks et al.
2008/0279534 A1 11/2008 Buttars
2008/0281971 A1 11/2008 Leppanen et al.
2008/0282299 A1 11/2008 Koat et al.
2008/0297669 A1 12/2008 Zalewski et al.
2008/0306903 A1 12/2008 Larson et al.
2008/0320523 A1 12/2008 Morris et al.
2009/0013356 A1 1/2009 Doerr et al.
2009/0030802 A1 1/2009 Plotnick et al.
2009/0031335 A1 1/2009 Hendricks et al.
2009/0031384 A1 1/2009 Brooks et al.
2009/0064221 A1 3/2009 Stevens
2009/0083279 A1 3/2009 Hasek
2009/0083811 A1 3/2009 Dolce et al.
2009/0083813 A1 3/2009 Dolce et al.
2009/0086643 A1 4/2009 Kotrla et al.
2009/0086722 A1 4/2009 Kaji
2009/0089438 A1 4/2009 Agarwal et al.
2009/0098861 A1 4/2009 Kalliola et al.
2009/0100459 A1 4/2009 Riedl et al.
2009/0100493 A1 4/2009 Jones et al.
2009/0113472 A1 4/2009 Sheth et al.
2009/0133048 A1 5/2009 Gibbs et al.
2009/0133090 A1 5/2009 Busse
2009/0141696 A1 6/2009 Chou et al.
2009/0150400 A1 6/2009 Abu-Hakima et al.
2009/0150917 A1 6/2009 Huffman et al.
2009/0151006 A1 6/2009 Saeki et al.
2009/0158311 A1 6/2009 Hon et al.
2009/0172776 A1 7/2009 Makagon et al.
2009/0175218 A1 7/2009 Song et al.
2009/0177794 A1 7/2009 Alexander et al.
2009/0185576 A1 7/2009 Kisel et al.
2009/0187939 A1 7/2009 Lajoie
2009/0193486 A1 7/2009 Patel et al.
2009/0201917 A1 8/2009 Maes et al.
2009/0210899 A1 8/2009 Lawrence-Apfelbaum et al.
2009/0210912 A1 8/2009 Cholas et al.
2009/0225760 A1 9/2009 Foti
2009/0235308 A1 9/2009 Ehlers et al.
2009/0240829 A1* 9/2009 Hildebrand ............. H04L 67/02
709/232
2009/0282241 A1 11/2009 Prafullchandra et al.
2009/0282449 A1 11/2009 Lee
2009/0293101 A1 11/2009 Carter et al.
2009/0296621 A1 12/2009 Park et al.
2009/0313116 A1 12/2009 Ashbaugh
2010/0012568 A1 1/2010 Fujisawa et al.
2010/0027560 A1 2/2010 Yang et al.
2010/0030578 A1 2/2010 Siddique et al.
2010/0031299 A1 2/2010 Harrang et al.
2010/0042478 A1 2/2010 Reisman
2010/0043030 A1 2/2010 White
2010/0083329 A1 4/2010 Joyce et al.
2010/0083362 A1 4/2010 Francisco et al.
2010/0106846 A1 4/2010 Noldus et al.
2010/0115091 A1 5/2010 Park et al.
2010/0115113 A1 5/2010 Short et al.

(56) References Cited

U.S. PATENT DOCUMENTS

2010/0122274 A1 5/2010 Gillies et al.
2010/0122276 A1 5/2010 Chen
2010/0125658 A1 5/2010 Strasters
2010/0131973 A1 5/2010 Dillon et al.
2010/0138858 A1* 6/2010 Velazquez ............ H04N 21/435 725/33
2010/0138900 A1 6/2010 Peterka et al.
2010/0169977 A1 7/2010 Dasher et al.
2010/0199299 A1 8/2010 Chang et al.
2010/0199312 A1 8/2010 Chang et al.
2010/0217613 A1 8/2010 Kelly
2010/0218231 A1 8/2010 Frink et al.
2010/0219613 A1 9/2010 Zaloom et al.
2010/0251304 A1 9/2010 Donoghue et al.
2010/0251305 A1 9/2010 Kimble et al.
2010/0269144 A1 10/2010 Forsman et al.
2010/0280641 A1 11/2010 Harkness et al.
2010/0287585 A1 11/2010 Frondal et al.
2010/0287609 A1 11/2010 Gonzalez et al.
2010/0313225 A1 12/2010 Cholas et al.
2010/0325547 A1 12/2010 Keng et al.
2011/0015989 A1 1/2011 Tidwell et al.
2011/0016479 A1 1/2011 Tidwell et al.
2011/0016482 A1 1/2011 Tidwell et al.
2011/0071841 A1 3/2011 Fomenko et al.
2011/0090898 A1 4/2011 Patel et al.
2011/0093900 A1 4/2011 Patel et al.
2011/0099017 A1 4/2011 Ure
2011/0102600 A1 5/2011 Todd
2011/0103374 A1 5/2011 Lajoie et al.
2011/0107379 A1 5/2011 Lajoie et al.
2011/0107436 A1 5/2011 Cholas et al.
2011/0110515 A1 5/2011 Tidwell et al.
2011/0119637 A1 5/2011 Tuli et al.
2011/0126018 A1 5/2011 Narsinh et al.
2011/0138064 A1 6/2011 Rieger et al.
2011/0145049 A1 6/2011 Hertel et al.
2011/0166932 A1 7/2011 Smith et al.
2011/0173053 A1 7/2011 Aaltonen et al.
2011/0173095 A1 7/2011 Kassaei et al.
2011/0178943 A1 7/2011 Motahari et al.
2011/0191801 A1 8/2011 Vytheeswaran
2011/0213688 A1 9/2011 Santos et al.
2011/0219229 A1 9/2011 Cholas et al.
2011/0252146 A1* 10/2011 Santamaria ......... H04L 65/1083 709/227
2011/0265116 A1 10/2011 Stern et al.
2011/0276881 A1 11/2011 Keng et al.
2012/0005527 A1 1/2012 Engel et al.
2012/0008786 A1 1/2012 Cronk et al.
2012/0011567 A1 1/2012 Cronk et al.
2012/0023535 A1 1/2012 Brooks
2012/0030363 A1 2/2012 Conrad
2012/0124606 A1 5/2012 Tidwell et al.
2012/0144416 A1 6/2012 Wetzer et al.
2012/0185899 A1 7/2012 Riedl et al.
2012/0287816 A1* 11/2012 Zhou ................... H04L 47/2408 370/253
2013/0014140 A1 1/2013 Ye et al.
2013/0014171 A1 1/2013 Sansom et al.
2013/0024888 A1 1/2013 Sivertsen
2013/0046849 A1 2/2013 Wolf et al.
2013/0097647 A1 4/2013 Brooks et al.
2013/0117692 A1 5/2013 Padmanabhan et al.
2013/0212299 A1* 8/2013 Grundemann ...... H04L 61/2546 709/245
2013/0227284 A1 8/2013 Pfeffer et al.
2013/0346564 A1* 12/2013 Warrick .............. H04L 65/1045 709/219
2014/0051485 A1* 2/2014 Wang ................ H04W 52/0251 455/574
2014/0074855 A1 3/2014 Zhao et al.
2014/0223505 A1* 8/2014 Lazaridis ............. H04N 21/414 725/116
2014/0254546 A1* 9/2014 L'Heureux ......... H04W 12/082 370/331
2014/0281707 A1* 9/2014 Su ......................... H04L 65/611 709/213
2014/0281904 A1* 9/2014 Burckart ............... G06F 16/972 715/234
2014/0359153 A1* 12/2014 Heng ...................... H04L 65/65 709/231
2015/0006744 A1* 1/2015 Chatterjee ........... H04L 65/1073 709/228
2015/0040176 A1 2/2015 Hybertson et al.
2015/0095932 A1 4/2015 Ren
2015/0271865 A1* 9/2015 Carson .................. H04L 45/245 370/329
2015/0350714 A1* 12/2015 Normile ............... H04N 21/437 725/100
2015/0381680 A1* 12/2015 Thornburgh .......... H04L 65/611 709/231
2016/0134912 A1 5/2016 Dillon et al.
2016/0337464 A1* 11/2016 Eriksson ............... H04L 67/562
2017/0048336 A1* 2/2017 Novo Diaz ............. H04L 67/02
2017/0177321 A1* 6/2017 Seastrom ........... H04N 21/4432
2017/0230702 A1 8/2017 Sarosi et al.
2017/0251026 A1* 8/2017 Straub ................... H04L 65/102
2017/0339200 A1* 11/2017 Roy ...................... H04L 65/611
2018/0054774 A1* 2/2018 Cohn ...................... G08B 25/08
2018/0359621 A1* 12/2018 Singhal ................... H04L 67/51
2019/0200062 A1 6/2019 Cronk et al.
2020/0059497 A1* 2/2020 Straub ................... H04L 67/145
2022/0182421 A1* 6/2022 Straub ................... H04L 65/611
2024/0106868 A1* 3/2024 Straub ................... H04L 65/102

FOREIGN PATENT DOCUMENTS

JP 2001275090 A 10/2001
JP 2005519365 A 6/2005
JP 2005519501 A 6/2005
JP 2005339093 A 12/2005
JP 2008015936 A 1/2008
JP 2009211632 A 9/2009
JP 2010502109 A 1/2010
JP 2010079902 A 4/2010
JP 2012505436 A 3/2012
JP 2012523614 A 10/2012
WO WO-0110125 A1 2/2001
WO WO-2005015422 A1 2/2005
WO WO-2005031524 A2 4/2005
WO WO-2007060451 A2 5/2007
WO WO-2012021245 A1 2/2012
WO WO-2012114140 A1 8/2012

OTHER PUBLICATIONS

Cantor., et al., "Bindings for the OASIS Security Assertion Markup Language (SAML) V2.0," Oasis Standard, Mar. 2005, DocumentID saml-bindings-2.0-os, ( http://docs.oasis-open.org/security/saml/v2.0/saml-bindings-2.0-os.pdf ), 46 pages.
DLNA (Digital Living Network Alliance) protocols described in DLNA Networked Device Interoperability Guidelines Expanded, Mar. 2006 and subsequent expanded version dated Oct. 2006, 23 pages.
Florin L., et al., "Content Delivery and Management in Networked MPEG-4 System," 2000 10th European Signal Processing Conference, IEEE, Sep. 4, 2000 (Sep. 4, 2000), pp. 1-4, XP032755920, ISBN: 978-952-15-0443-3 [retrieved on Mar. 31, 2015].
OpenCable, Enhanced TV Binary Interchange, Format 1.0 OC-SP-ETV-BIF1.0-104-070921 Date: Sep. 21, 2007, 420 pages.
Pantjiaros C.A. P., et al., "Broadband Service Delivery: Cy.T.A. Adsl Field Trial Experience", Electrotechnical Conference, 2000 MELECON, 2000 10th Mediterranean, May 29-31, 2000, Piscataway, NJ, USA, IEEE, vol. 1, May 29, 2000 (May 29, 2000), pp. 221-224, XP010518859, ISBN: 978-0-7803-6290-1.
Redux Screenshot from http://www.redux.com , "Select a Channel to Start Watching" © 2014 Redux, Inc.014 Redux, Inc. All rights reserved; http://www.redux.com/ , 2 pages.

(56) References Cited

OTHER PUBLICATIONS

Savolainen T., et al., "IPv6 Addressing Strategies for loT," IEEE Sensors Journal, 2013, vol. 13 (10), pp. 3511-3519.
Siebenlist F., et al., "Global Grid Forum Specification Roadmap towards a Secure OGSA," Jul. 2002, pp. 1-22.
Spagna S., et al., "Design Principles of an Operator-owned Highly Distributed Content Delivery Network," IEEE Communications Magazine, 2013, vol. 51 (4), pp. 132-140.
UTF-32, IBM, retrieved from http://publib.boulder.ibm.com/infocenter/iseries/v5r3/index.jsp?topic=%2Fnls%2Frbagsutf32.htm on Aug. 28, 2013, 1 page.

* cited by examiner

APPARATUS AND METHODS FOR CENTRALIZED MESSAGE EXCHANGE IN A USER PREMISES DEVICE

PRIORITY

This application is a continuation of and claims priority to co-owned U.S. patent application Ser. No. 17/675,408 of the same title filed on Feb. 18, 2022, and issuing as U.S. Pat. No. 11,843,641 on Dec. 12, 2023, which is a divisional of and claims priority to co-owned U.S. patent application Ser. No. 16/557,619 of the same title filed on Aug. 30, 2019, and issued as U.S. Pat. No. 11,258,832 on Feb. 22, 2022, which is a divisional of and claims priority to co-owned U.S. patent application Ser. No. 15/055,205 of the same title filed on Feb. 26, 2016, and issued as U.S. Pat. No. 10,404,758 on Sep. 3, 2019, each of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The disclosure relates generally to the field of networking and content delivery. In one exemplary aspect, the disclosure relates to the use of a network architecture for centralized message exchange via apparatus disposed on a user premises (e.g., residence, enterprise, etc.).

2. Description of Related Technology

The provision of content to a plurality of subscribers in a network is well known. In a typical configuration, the content is distributed to the subscribers' devices over any number of different topologies including for example: (i) Hybrid Fiber Coaxial (HFC) network, which may include e.g., dense wave division multiplexed (DWDM) optical portions, coaxial cable portions, and other types of bearer media; (ii) satellite network (e.g., from an orbital entity to a user's STB via a satellite dish); (iii) optical fiber distribution networks such as e.g., "Fiber to the X" or FTTx (which may include for example FTTH, FTTC, FTTN, and FTTB variants thereof); (iv) Hybrid Fiber/copper or "HFCu" networks (e.g., a fiber-optic distribution network, with node or last-mile delivery being over installed POTS/PSTN phone wiring or CAT-5 cabling); (v) microwave/millimeter wave systems; etc.

Various types of content delivery mechanisms are utilized in providing content to subscribers. For example, certain content may be provided in accordance with "push" technology where a content server "pushes" unsolicited or asynchronous information out to specific client devices. Push services may be based on information preferences expressed in advance. In a publish-subscribe model, a client device "subscribes" to various information "channels" provided by the content server; whenever new content is available on one of those channels, the server pushes the information out to the client device. Examples of content delivery services that use push technology include instant messaging applications, video streaming services, Emergency Alert System (EAS), market data distribution services (e.g., stock tickers), sports results distribution services, home monitoring applications, and home device control applications.

A content server can push data to a client device over a full-duplex connection. For example, a web server can push information to a web server via a Transmission Control Protocol (TCP) connection. In U.S. cable systems, for instance, out-of-band (OOB) channels (and associated protocols) may be used to deliver asynchronous messages (e.g., global software updates, EAS notification, service entitlement distribution) to a subscriber device, as well as to provide communication between the headend of the content-distribution network and the sub scriber device.

The content server communicates with each client device over a dedicated connection. In some cases (e.g., instant messaging sessions, video streaming sessions), the content server does not terminate the connection after the data has been transmitted to the client device. The content server leaves the connection open so that if an event occurs for reporting data to the client device, the content server can send the data to the client device immediately. In other cases, the connection is kept open through a series of periodic messages, termed "keep-alive" (KA) or "heartbeat" messages, that are sent from the client device to the content server to indicate that the client device is ready to receive data, and that the connection should be preserved. Because many centralized server systems are distributed computing structures fronted by e.g., a Global Server Load Balancer (GSLB) and a security firewall, a high cost is associated with maintaining hundreds of thousands or even millions of connections.

In scenarios where a one-time message is broadcast to multiple clients (e.g., in the aforementioned publish-subscribe model), a content server must send a message to each client device registered to receive the message from the content server. One example of a broadcast message is an EAS message. An EAS message may be targeted at a small geographic area (e.g., in the case of a storm), or to a large geographic area (e.g., in the case of a nuclear attack). The EAS server may provide the EAS notification to client devices via unicast mechanisms (i.e., each client device receives an individual copy of the message). As such, delivery of EAS messages to millions or hundreds of millions of client devices would be greatly bandwidth-inefficient and take considerable amounts of processing power. Further, typical content delivery networks may not have sufficient bandwidth capacity to support unicast delivery of EAS messages to a large number of client devices, whether due to "core" infrastructure, "edge" infrastructure, third-party infrastructure, or combinations of the foregoing. Although, some network topologies and architectures have a more efficient "multicast" capability which more effectively uses available bandwidth, most Internet Protocol (IP)-enabled client devices (and even some network infrastructure) do not support such multicast, and hence networks are relegated to use of the less efficient unicast or similar mechanism for delivery of broadcast messages.

The foregoing inefficiencies can be even more pronounced when multiple clients are each trying to communicate with entities or processes within the core portion of a network; e.g., the headend, or via "backbone" or other common core infrastructure.

In some home monitoring and home device control applications, each premises device is in communication with a centralized server—which is remote to the home. When a first premises device needs to be informed of a change of state of a second premises device, the second premises device communicates the state change to the centralized server, and the centralized server pushes a message to the first premises device notifying it of the state change of the second premises device. For example, when a remote control application with a graphic display needs to be informed of a change of state within a display device, the display device (or process relating thereto) would typically cause communication of the instruction to a remote central messaging server, which would then send a message using push technology to the remote control. As the messaging server may be thousands of miles from the home and encumbered by multiple network and switching delays, the delay between the changing of the display device and the notification on the remote control may cause the user to perform multiple button presses, and accordingly be annoyed by the lack of responsiveness of the system.

Hence, it would be desirable to provide mechanisms for exchanging messages between a content provider and a user premises device that more effectively uses communications bandwidth and processing power. It would also be desirable to provide mechanisms for exchanging messages within a user premises that provides less latency and more responsiveness than mechanisms that require repetitive transmissions to/from a central server.

SUMMARY

The present disclosure addresses the foregoing needs by disclosing, inter alia, apparatus and methods for centralized message exchange via apparatus disposed on or "near" a user premises (e.g., residence, enterprise, etc.).

In a first aspect of the disclosure, a method of minimizing a number of network connections maintained by a premises gateway device is described. In one embodiment, the gateway device comprises a local message server process, and the method includes utilizing the message server to aggregate messages originated from higher layer processes within respective client devices served by the premises gateway into a single network or transport layer message for transmission to a remote network entity requiring that a network or transport layer connection be maintained.

In a second aspect of the disclosure, a premises gateway device for managing upstream communications between client devices of a premises network and a service provider is disclosed. In one embodiment, the premises gateway device includes: a first apparatus configured to receive first data from a first client device of the premises network; a second apparatus configured to receive second data from a second client device of the premises network; a third apparatus configured to communicate third data to a device of the service provider; and a processor apparatus in data communication with the first, second and third apparatus and configured to execute at least one computer program.

In one variant, the at least one program is configured to, when executed by the processor apparatus, cause the premises gateway device to: receive the first data from the first client device via the first apparatus; receive the second data from the second client device via the second apparatus; generate a single message based at least in part on the first data and the second data; and communicate the single message to the device of the service provider via the third apparatus.

In one implementation, each of the first data and the second data comprises an application layer keep-alive message for maintaining a respective streaming connection, and the single message comprises a transport or network layer keepalive message, and the generated single message further comprises information identifying the streaming connections associated with the first client device and the second client device.

In another implementation, each of the first data and the second data comprises a request to subscribe to publish-subscribe content provided by the service provider.

In another aspect of the disclosure, a premises gateway device for managing communications between a service provider and client devices of a premises network is described. In one embodiment, the premises gateway device includes: local area network interface apparatus configured to communicate data to at least a first client device and a second client device of the premises network; a network interface apparatus configured to receive data generated by a device of the service provider; a processor apparatus in data communication with the first, second and third apparatus; and a server process operative to execute on the processor apparatus.

In one variant, the server process is configured to, when executed by the processor apparatus, causes the premises gateway to: receive the data generated by the device of the service provider via the network interface apparatus; evaluate the received data; based at least in part on the evaluation, determine that the at least a portion of the received data is to be communicated to both the first client device and the second client device; generate a first message based at least in part on the at least portion of the received data; communicate the first message to the first client device via the first apparatus; generate a second message based at least in part on the at least portion of the received data; and communicate the second message to the second client device via the second apparatus.

In one implementation, the server process comprises a process utilizing at least and Extensible Messaging and Presence Protocol (XMPP) ad a Secure Websockets (WSS) protocol, and the received data comprises information identifying the first client device and the second client device.

In another implementation, the received data comprises an Emergency Alert Services (EAS) notification.

In a further implementation, the server process further comprises computerized logic configured to determine first and second acceptable formats associated with the first and second client devices, respectively, and the generation of the first and second messages comprises generation of the first message in the first format, and the second message in the second format.

In another aspect of the disclosure, apparatus for handling asynchronous messaging between devices connected with a content distribution network is disclosed. In one embodiment, the apparatus includes: a first interface for communication with at least one network device associated with the content distribution network; a second interface for communication with a first client device; a third interface for communication with a second client device; and a processor apparatus in data communication with each of the first, second and third interfaces and configured to execute at least one computer program.

In one variant, the at least one computer program is configured to, when executed by the processor apparatus, cause the apparatus to: manage, via the first interface, a first connection for communicating asynchronous messages associated with the first client device, the second client device, and both the first client device and the second client device to and from the at least one network device; manage, via the second interface, a second connection for communicating asynchronous messages to and from the first client device; manage, via the third interface, a third connection for communicating asynchronous messages to and from the second client device; communicate asynchronous messages associated with the first client device, the second client device, and both the first the first and second client devices to and from the at least one network device over the first connection; and communicate asynchronous messages exchanged between the first and second client devices over only the second connection and the third connection.

In one implementation, the first connection comprises a transmission control protocol (TCP) connection.

In yet a further aspect of the disclosure, anon-transitory computer readable apparatus is disclosed. In one embodiment, the apparatus includes a storage medium including at least one computer program implementing computerized logic, the computerized logic comprising a message server process configured to, when executed on a host platform within a premises network: aggregate two or more messages received by the host platform from different client devices within the premises network into a single consolidated message before transmission of the single consolidated message to a remote network server, the two or more messages associated with respective application layer processes of the different client devices, and the single consolidated message comprising a transport layer message configured to maintain an open socket or connection; disaggregate single messages received by the host platform and originated from the remote network server for distribution to at least the different client devices; and route messages originated from one of different client devices and addressed to another of the different client devices only locally so as to obviate sending the routed messages to the remote network server.

In still another aspect, a method of operating a premises network having a plurality of client devices associated therewith so as to reduce at least one of (i) network bandwidth consumption, and/or (ii) communications latency, is disclosed. In one embodiment, the method includes: receiving at least first and second messages from respective ones of first and second client devices, the first and second messages intended for a remote network server; aggregating the at least first and second message into a common message; transmitting the common message to the remote network server; receiving from the remote server a response to the common message; dis-aggregating the received response; and delivering at least portions of the received response to each of the first and second client devices.

In a further aspect of the disclosure, a premises gateway device architecture is disclosed. In one embodiment, the architecture comprises a local message server operable to interface with multiple heterogeneous client device environments or services via a Secure WebSockets process, using both publish-subscribe and RESTful communications interfaces.

These and other aspects shall become apparent when considered in light of the disclosure provided herein.

Figure 1:
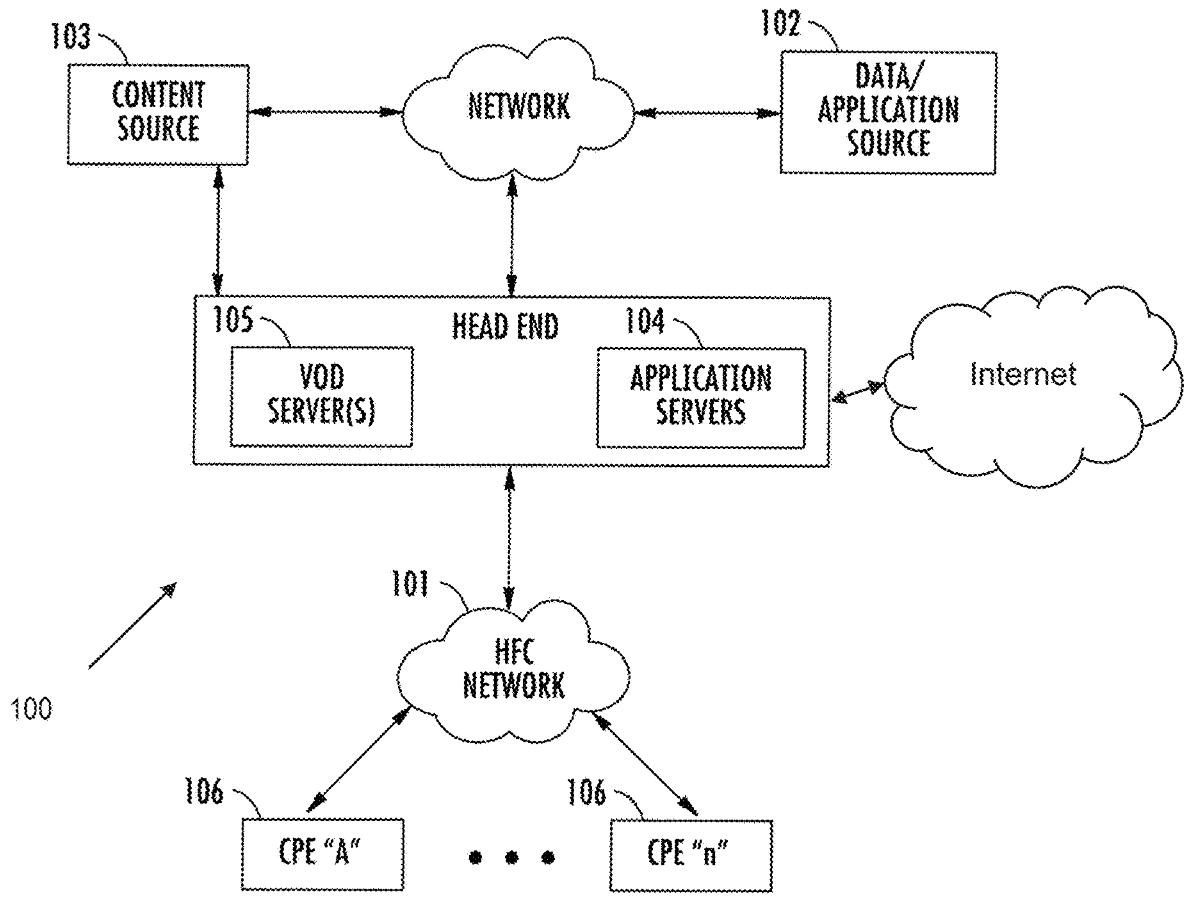
FIG. 1 is a functional block diagram illustrating an exemplary hybrid fiber network configuration useful with the present disclosure.

All Figures © Copyright 2016 Time Warner Cable, Inc. All rights reserved.

DETAILED DESCRIPTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or user's premises and connected to or in communication with a network. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the terms "keepalive", "keep-alive" and similar may refer, without limitation, to communications (e.g., messages or signals), functions, or other approaches for indicating a status of one or more entities or processes, and may include for example TCP (OSI layer 4/5) keepalive messages, higher layer (e.g., OSI layer 7 or "application layer") keep-alive functions, etc. as applicable to the prevailing context.

As used herein, the terms "MSO" or "multiple systems operator" refer to a cable, satellite, or terrestrial network provider having infrastructure required to deliver services including programming and data over those mediums.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi"® refers to, without limitation, any of the variants of IEEE-Std. 802.11 or related standards including 802.11 a/b/g/n/s/v/ac or 802.11-2012, as well as so-called "Wi-Fi Direct", each of the foregoing incorporated herein by reference in its entirety.

As used herein, the term "wireless" means any wireless signal, data, communication, or other interface including without limitation Wi-Fi, Bluetooth®, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, RFID/NFC, narrowband/FDMA, OFDM, PCS/DCS, LTE/LTE-A, analog cellular, CDPD, satellite systems, millimeter wave or microwave systems, acoustic, and infrared (i.e., IrDA).

Overview

The present disclosure provides, inter alia, methods and apparatus for providing a messaging server within a CPE;

e.g., a home or residential gateway device, or at another network "edge" location in physical/logical proximity to the CPE. In one aspect, a system is described that includes a premises device that, inter alia, acts as a unified proxy or centralized client messaging platform providing messaging services between a content provider and client devices, and between client devices within a premises network. This premises device may be used, for example, in a home or residential environment, enterprise or corporate environment, military or government environment, or combinations of the foregoing. The premises device acts as a central messaging server for some or all devices in the premises via a cable or satellite modem or other such network interface, communicating and exchanging messages with and between devices throughout the premises, and providing a wired and wireless network in the home.

In one embodiment, the client devices associated with the premises (which may or may not be physically located at the premises at any given time) register with the premises device using their private network addresses e.g., RFC-1918 IPv4 or link-local IPv6 addresses. These private network addresses are commonly used for devices within home, office, and enterprise local area networks (LANs). When a client device needs to send a message to another client device within the premises network (again, which may or may not be physically located therein), the premises device will enable the message to bypass the long trip and propagation delay over the Internet or other interconnection medium (aka a long "hairpin"), and "connect" the message directly to the other client device across the premises network; e.g., within the home or building or other physically/logically proximate location within the premises network.

In one variant, the premises device is an Extensible Messaging and Presence Protocol (XMPP) and Secure Websockets (WSS) protocol-enabled gateway that is allocated a publicly routable IP address, and includes a network address translator (NAT) function to provide Internet connectivity to the client devices. The messaging server within the premises device enables messages to be communicated between a content provider outside the premises network and the client devices via a single connection e.g., a single Internet connection. At the request of client devices, the premises device registers with content providers for specific publish-subscribe broadcast messages, and performs the distribution of the messages to the client devices. For any Internet connections that need to be preserved for receiving content (e.g., TCP/IP socket or similar), the premises device sends a single keepalive message to a content provider, and handles the keep-alive messaging from the local devices (e.g., at the application layer) within the premises network.

Advantageously, the foregoing use of the messaging server within the premises device minimizes the number of Internet connections that need to be opened and the number of messages communicated with servers outside of the premises network which, inter alia, saves network bandwidth and computation time.

In another variant, aggregation of communications is used with respect to multiple client devices within the premises network utilizing a common Internet or other connection, such that if any of the clients are utilizing the connection, the connection is kept alive via a single "coincidence" message versus individual messages for each of the clients.

In yet a further variant, aggregation of communications is accomplished at one or more network "edge" nodes with respect to multiple premises networks. Hence, the edge node virtualizes or aggregates the various premises (which each in turn may aggregate their respective associated client devices, or alternatively operate without such aggregation).

The various aspects of the present disclosure may have utility in any number of different applications, including (without limitation), within home or premises gateways, set-top boxes, smart TVs, remote controls, and/or mobile device applications running via a network connection within the home that contains software products such as e.g., video applications, home monitoring applications, and home device control (e.g., "Internet of Things" or IOT).

Detailed Description of Exemplary Embodiments

Exemplary embodiments of the apparatus and methods are now described in detail. While these exemplary embodiments are described in the context of the aforementioned hybrid fiber coax (HFC) cable system architecture having an multiple systems operator (MSO), digital networking capability, IP delivery capability, and plurality of client devices/CPE, the general principles and advantages of the present disclosure may be extended to other types of networks and architectures, whether broadband, narrowband, wired or wireless, managed or unmanaged, or otherwise, the following therefore being merely exemplary in nature.

It will also be appreciated that while described generally in the context of a consumer (e.g., home) end user domain, the present disclosure may be readily adapted to other types of environments (e.g., commercial/enterprise, government/military, etc.) as well. Myriad other applications are possible.

Also, while certain aspects are described primarily in the context of the well-known Internet Protocol, it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Content Distribution Network—

FIG. 1 illustrates a typical content distribution network configuration with which the exemplary apparatus and methods of the present disclosure may be used. The various components of the exemplary embodiment of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 103, 104, 105, 106 is shown in FIG. 1 for simplicity, although it will be recognized that comparable architectures with multiple origination points, distribution servers, VOD servers, and/or CPE devices (as well as different network topologies) may be utilized consistent with the present disclosure. For example, the headend architecture of FIG. 1*a* (described in greater detail below), or others, may be used.

Figure 1A:
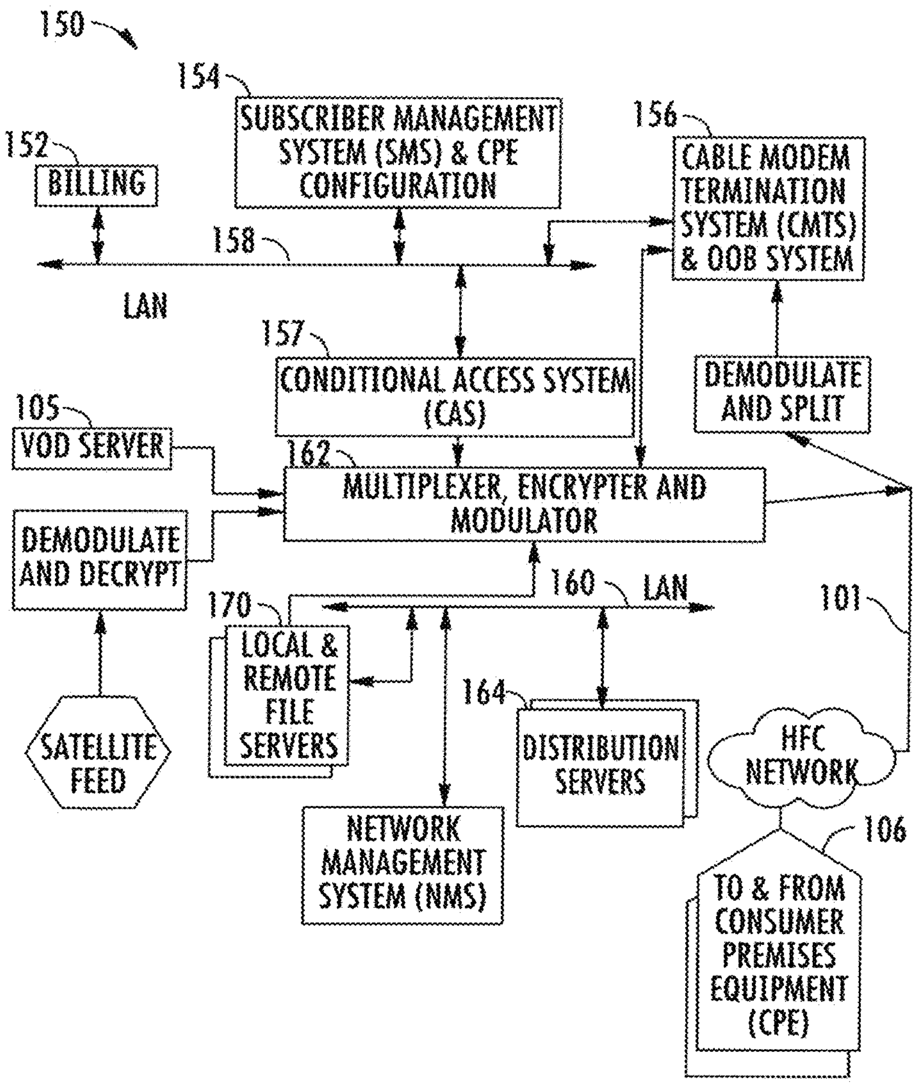
FIG. 1*a* is a functional block diagram illustrating one exemplary network headend configuration useful with the present disclosure.

FIG. 1*a* shows one exemplary embodiment of a headend architecture is described. As shown in FIG. 1*a*, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1*a* is high-level, conceptual architecture, and that each MSO may have multiple headends deployed using custom architectures.

Figure 1B:
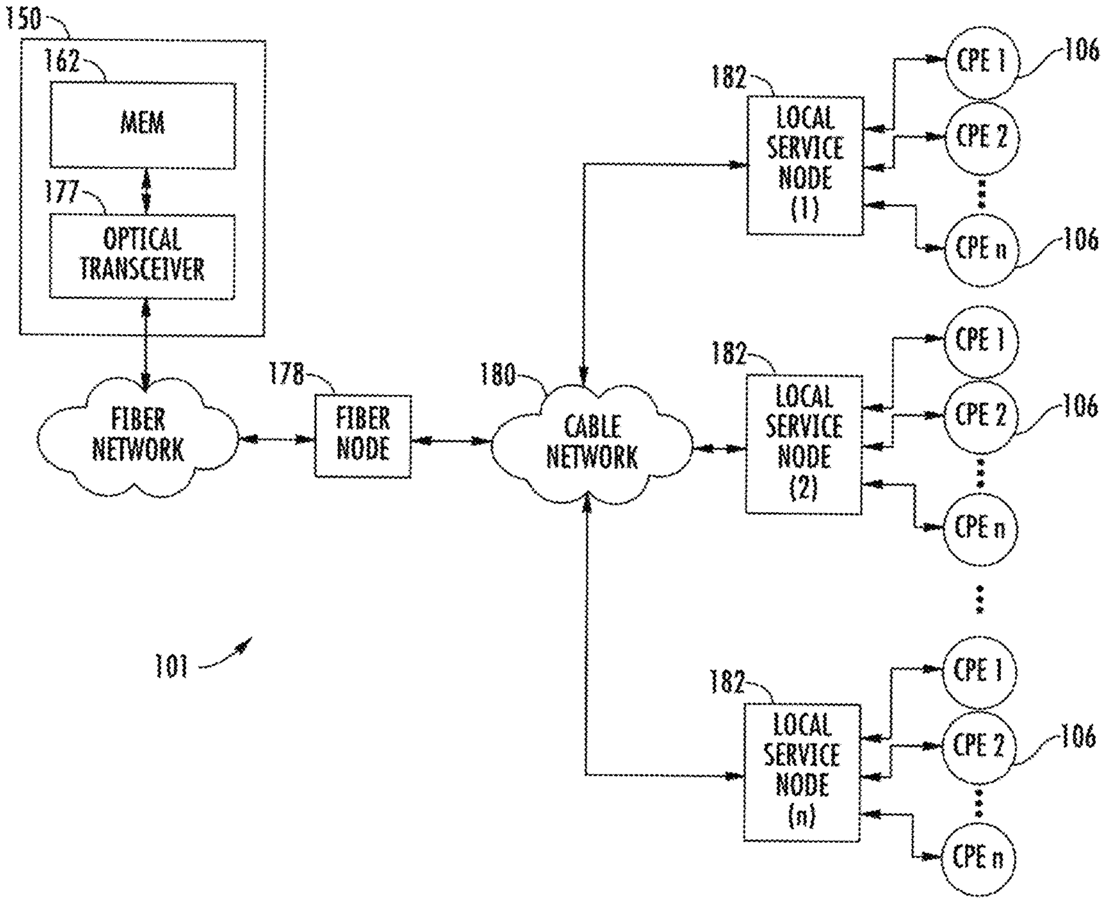
FIG. 1B is a functional block diagram illustrating one exemplary local service node configuration useful with the present disclosure.

The exemplary architecture 150 of FIG. 1*a* further includes a conditional access system (CAS) 157 and a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1B) via a variety of interposed network components.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the present disclosure is in no way limited to these approaches.

Figure 1C:
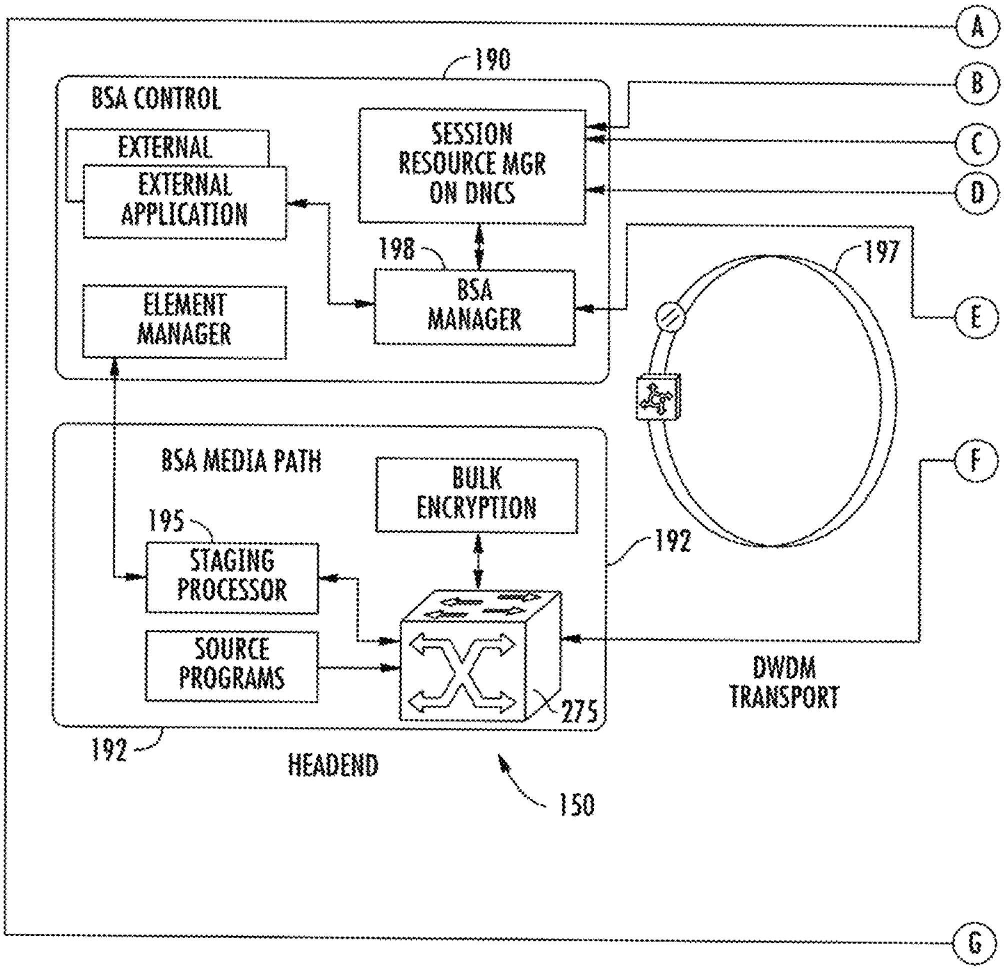
FIG. 1*c* is a functional block diagram illustrating one exemplary broadcast switched architecture (BSA) network useful with the present disclosure.
Figure 1C:
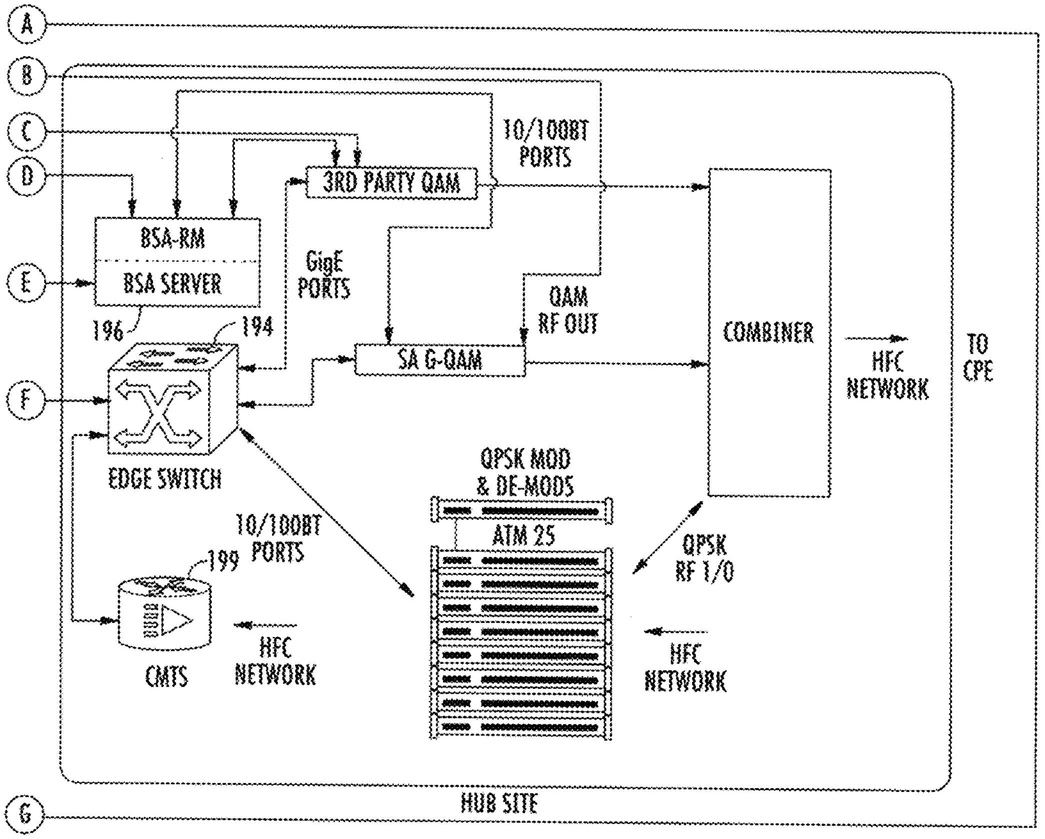

FIG. 1*c* illustrates an exemplary "switched" network architecture which may be used consistent with the present disclosure for, inter alia, provision of services to the venue (s) of interest. Specifically, the headend 150 contains switched broadcast control 190 and media path functions 192; these element cooperating to control and feed, respectively, downstream or edge switching devices 194 at the hub site which are used to selectively switch broadcast streams to various service groups. BSA (broadcast switched architecture) media path 192 may include a staging processor 195, source programs, and bulk encryption in communication with a switch 275. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

In addition to "broadcast" content (e.g., video programming), the systems of FIGS. 1*a* and 1*c* (and 1*d* discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1*c*, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels (e.g., DOCSIS QAMs) that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Figure 1D:
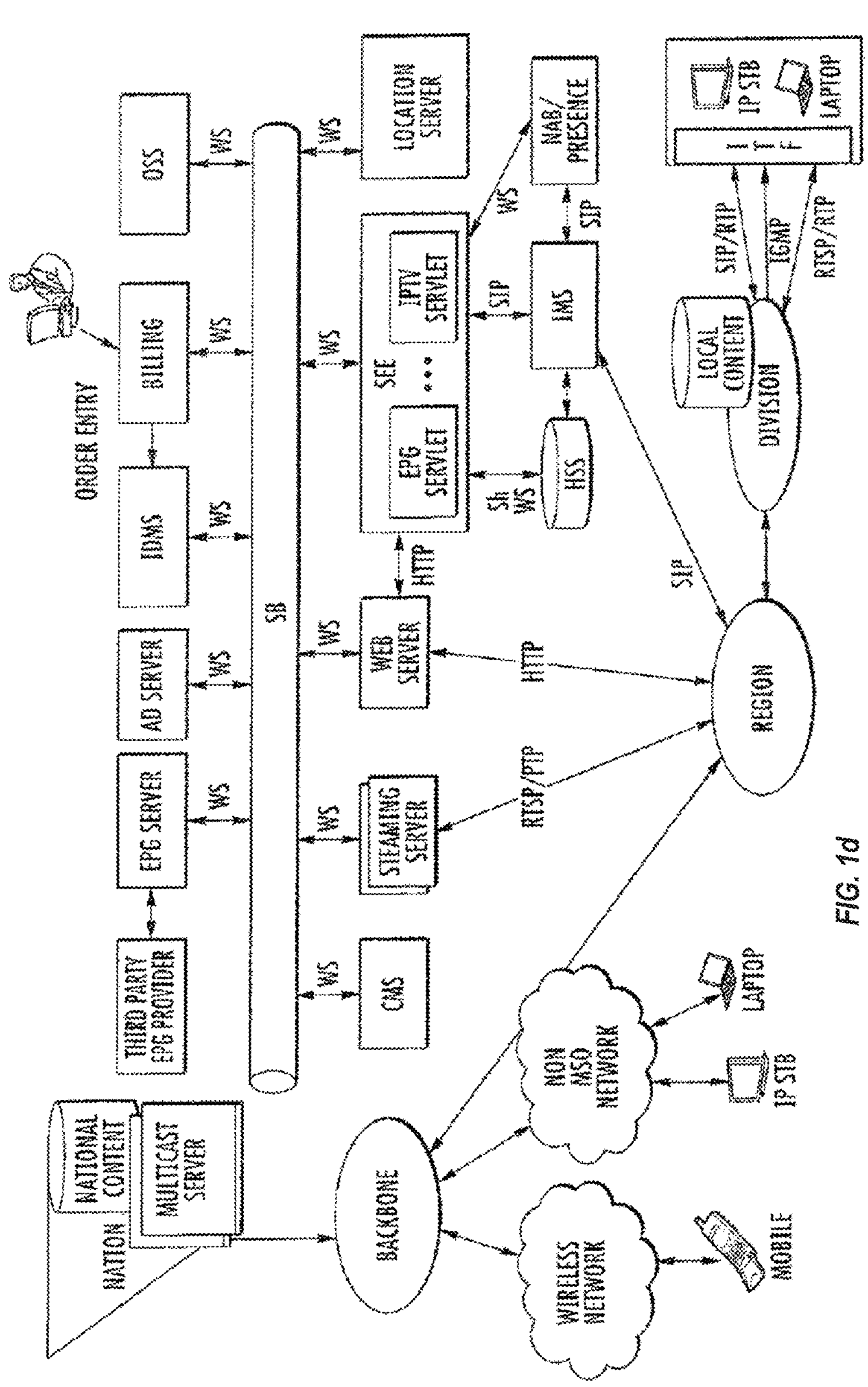
FIG. 1*d* is a functional block diagram illustrating one exemplary packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., IPTV content). FIG. 1*d* illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures. It is further appreciated that while FIG. 1*d* illustrates an exemplary presence server, one or more other types of servers useful in supporting the functionality described herein may be employed in the architecture of FIG. 1*d*, including without limitation so-called "push notification" servers.

Figure 1E:
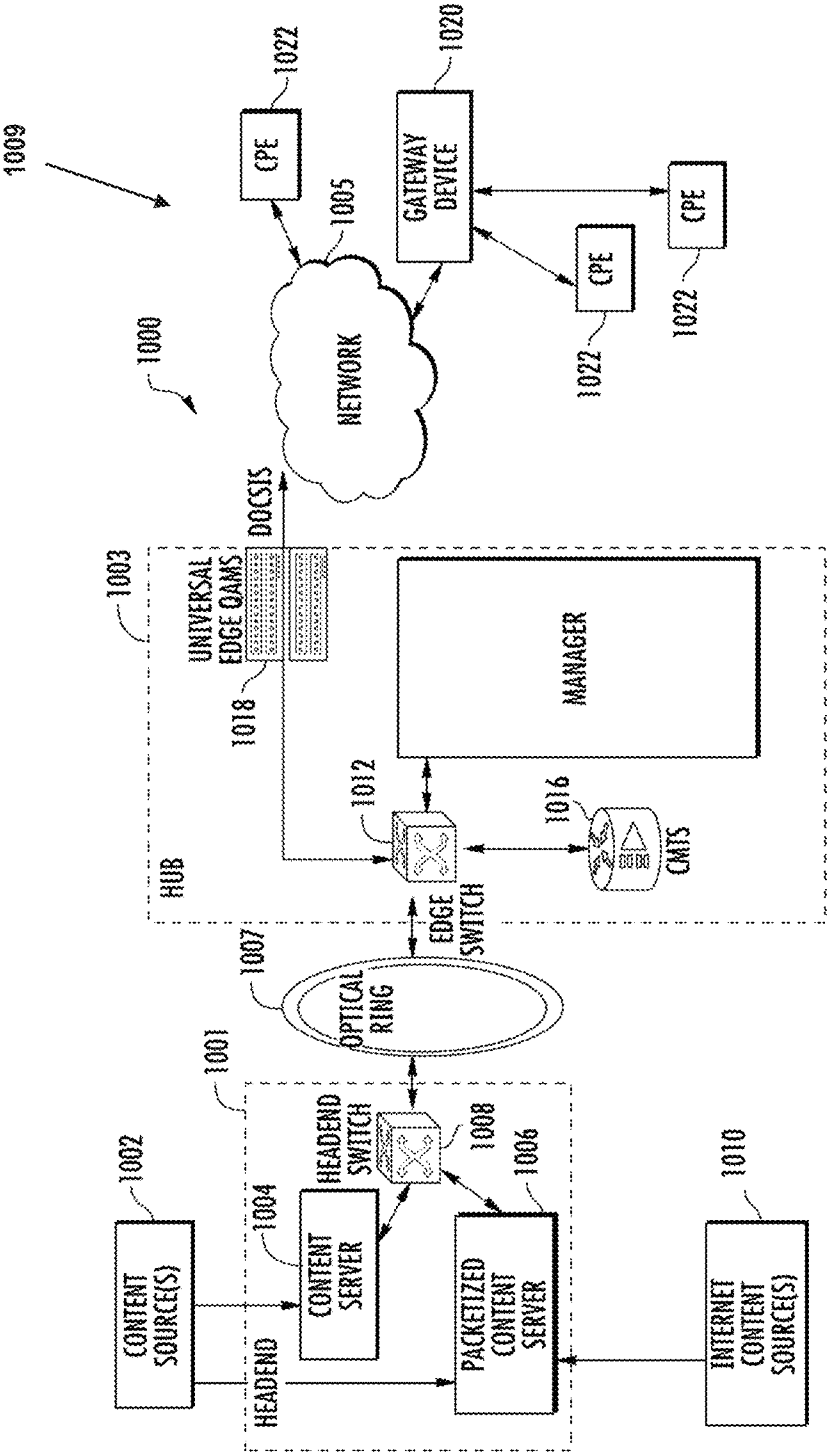
FIG. 1*e* is a functional block diagram illustrating a second exemplary packetized content delivery network architecture useful with various aspects of the present disclosure.

Referring now to FIG. 1*e*, another exemplary network architecture for the delivery of packetized content disclosure useful with the present disclosure. In addition to on-demand and broadcast content (e.g., video programming), the system of FIG. 1*e* may deliver Internet data services using the Internet protocol (IP), although other protocols and transport mechanisms of the type well known in the digital communication art may be substituted.

The network 1000 generally comprises a local headend 1001 in communication with at least one hub 1003 via an optical ring 1007. The distribution hub 1003 is able to provide content to one or more premises networks 1009 each having e.g., various user devices, CPE 1022, and gateway devices 1020, via a network 1005.

Various content sources 1002 are used to provide content to a content server 1004. For example, content may be received from a local, regional, or network content library. Alternatively, content may be received from linear analog or digital feeds, as well as third party content sources. Internet content sources 1010 (such as e.g., a web server) provide internet content to a packetized content server 1006. Other IP content may also be received at the packetized content server 1006, such as voice over IP (VoIP) and/or IPTV content. Content may also be received from subscriber and non-subscriber devices (e.g., a PC or smartphone-originated user made video). In one embodiment, the functionality of both the content server 1004 and packetized content server 1006 may be integrated into a single server entity.

A central media server located in the headend 1001 may be used as an installed backup to the hub media servers as (i) the primary source for lower demand services, and (ii) as the source of the real time, centrally encoded programs with PVR (personal video recorder) capabilities. By distributing the servers to the hub stations 1003 as shown in FIG. 1*e*, the size of the fiber transport network associated with delivering VOD services from the central headend media server is advantageously reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

Individual CPEs 1022 of the implementation of FIG. 1*e* may be configured to monitor the particular assigned RF channel (such as via a port or socket ID/address, or other such mechanism) for IP packets intended for the subscriber premises/address that they serve.

In the switched digital variant, the IP packets associated with Internet services are received by edge switch, and forwarded to the cable modem termination system (CMTS) 1016. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the CPE. The IP packets are typically transmitted on RF channels that are different than the RF channels used for the broadcast video and audio programming, although this is not a requirement. As noted above, the CPE are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 1018. According to this embodiment, all of the content is delivered on DOCSIS channels, which are received by a premises gateway 1020 (described subsequently herein) and distributed to one or more CPE 1022 in communication therewith. Alternatively, the CPE 1022 may be configured to receive IP content directly without need of the gateway or other intermediary. As a complementary or back-up mechanism, audio/video content may also be provided in downstream (in-band) channels as discussed above; i.e., via traditional "video" in-band QAMs. In this fashion, a co-enabled digital set top box (DSTB) or other CPE could readily tune to the new (in-band) RF video QAM in the event that their IP session over the DOC SIS QAM is for some reason interrupted. This may even be accomplished via appropriate logic within the CPE (e.g., autonomously, or based on signaling received from the headend or other upstream entity, or even at direction of a user in the premises; e.g., by selecting an appropriate DSTB or other CPE function).

In the embodiment illustrated in FIG. 1*e*, IP packetized content is provided to various user devices via the network 1005. For example, content may be delivered to a gateway apparatus 1020 which distributes content received thereat to one or more CPE 1022 in communication with the apparatus 1020.

In another variant, IP simulcast content and existing on-demand, voice, and broadcast content are all provided to the headend switch device 1008 of FIG. 1*e*. The headend switch 1008 then provides the content to the optical ring 1007 for provision to one or more distribution hubs 1003. IP simulcast content is in one exemplary implementation retrieved from a plurality of content sources at an IPTV server.

The IP-packet content is transmitted to subscriber devices via the universal edge QAM 1018 and the edge network 1005. The IP video ("simulcast") content is presented to client devices capable of receiving content over the DOCSIS QAMs. For example, the aforementioned gateway device 1020 (as well as an advanced CPE 1022 such as an IP-enabled DSTB may receive the IP simulcast. Legacy CPE may receive content via the gateway device 1020, or via an audio/video "back-up" MPEG transport stream as previously described.

In the illustrated embodiment, the gateway device 1020 serves as a gateway to the IP content for other client devices (such as other CPE 1022 and PMD). The gateway device 1020 may communicate with one or more connected CPE 1022, as well as utilize Wi-Fi capabilities (where so equipped) to communicate wirelessly to other devices. It will also be recognized that the present disclosure may be configured with one or more short-range wireless links such as Bluetooth for lower bandwidth applications (or UWB/PAN for greater bandwidth applications).

Premises Network—

Figure 2:
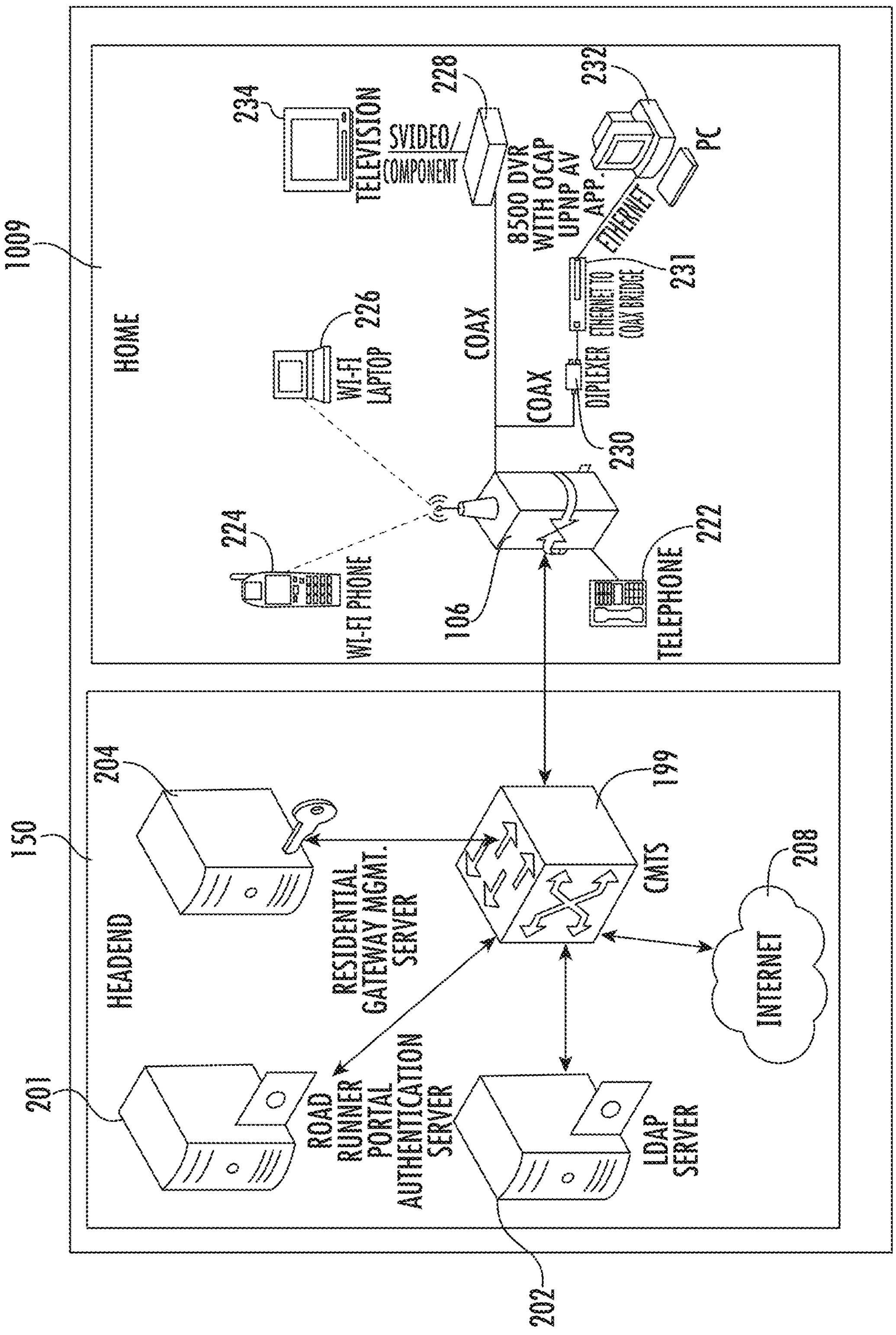
FIG. 2 is a functional block diagram of a content and data distribution network configured in accordance with one embodiment of the invention.

FIG. 2 is a block diagram of a premises network (e.g., network 1009 of FIG. 1*e* discussed above) and associated operator-side network elements configured in accordance with one embodiment of the disclosure. A portal authentication server 201, LDAP (Lightweight Directory Access Protocol) server 202, and gateway management server 204 are each coupled to a cable modem termination system (CMTS) 199 of the type well known in the art. These components are located at the head-end 150 in the illustrated embodiment, although it will be appreciated that the components may be disposed at various other locations as desired consistent with the architecture implemented. As previously described, the CMTS 199 is coupled also to an internet (e.g., the Internet) 208 which is located external to the head-end 150, such as via an Internet (IP) backbone or gateway (not shown).

The CMTS 199 is in the illustrated embodiment coupled to multiple households or other premises, including the exemplary illustrated household 140. In particular, the CMTS 199 is coupled via the aforementioned HFC network and local coaxial cable or fiber drop to the premises 140, including the consumer premises equipment (CPE) 106 which may be e.g., a premises gateway. The exemplary CPE 106 is in signal communication with any number of different devices including, e.g., a wired telephony unit 222, a Wi-Fi or other wireless-enabled phone 224, a Wi-Fi or other wireless-enabled laptop 226, a SIP phone, an H.323 terminal or gateway, etc. Additionally, the CPE 106 is also coupled to a digital video recorder (DVR) 228 and diplexer 230 via a coax cable. A network-to-coax bridge 231 places the coax environment in communication with a network (here, an Ethernet network complaint with IEEE Std. 802.3, although any number of other network protocols and topologies could be used) and a personal computer (PC) 232. The DVR 228 is also connected to a television or other monitor 234, which may be in communication via a wired or wireless interface (e.g., cabling, PAN or 802.15 UWB micro-net, etc.).

A premises LAN (PLAN) is created in the exemplary embodiment, which may include for example the network formed over the installed coaxial cabling in the premises (e.g., Ethernet with CAT-5/6 cabling or MoCA-based system), the Wi-Fi (WLAN) network, and so forth.

As a brief aside, current "gateway" devices used in content distribution networks such as cable television networks often consist of a network interface; e.g., cable modem, Small Form-factor Pluggable (SFP) or other transceiver, disposed within an host such as an IP network switch, or a combination of the interface, an internal network router (a.k.a. "gateway"), a Dynamic Host Configuration Protocol (DHCP) server, and a Wi-Fi or similar LAN interface. In the exemplary context of cable television networks, a narrow bandwidth broadcast signal has historically been used to send asynchronous messages to television set-top boxes (STBs) in order to perform such exercises as Emergency Alert System (EAS) notification, global software update, or service entitlement distribution. Such functions generally cannot be performed on the public (unmanaged) Internet, as the broadcast mechanism defined for IP utilizes User Datagram Protocol (UDP) messages on specific IP addresses that would tend to flood the bearer network. Additionally, networks within the subscriber's premises (and behind a premises router) will utilize a predetermined IP address range (e.g., one set forth in Internet Engineering Task Force (IETF) Request For Comments (RFC) 1918); such IP addresses are deemed non-routable on the public IP network, in that the network beyond the IP router does not permit the use of such RFC-1918 or IPV6 equivalent (link-local) non-routable addresses.

In contrast, the exemplary CPE 106 of the present disclosure (e.g., premises gateway) advantageously contains one or more messaging server processes therein; when the messaging server is contained within the premises network, the in-premises devices will register with that server (e.g., using their RFC-1918 IPV4 or link-local IPV6 address), and the premises server will then bypass the long trip over the Internet or other network infrastructure, and connect the messages across the premises "intranet" instead. This obviates potentially numerous "outbound" and "inbound" messages to/from distant servers (e.g., at the network core or elsewhere), and further greatly reduces latency, thereby improving responsiveness of various processes and functions, and increasing user/subscriber satisfaction.

Returning again to the exemplary CPE of FIG. 2, during operation, the CPE 106 exchanges signals with the CMTS 199 over the interposed coax (and/or other, e.g., fiber) bearer medium. The signals include e.g., Internet traffic, digital programming, and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 1009. In one embodiment, private network addresses e.g., RFC-1918 IPv4 or link-local IPv6 addresses, can be used by the CPE 106 (i.e., the "server" process thereof) to direct traffic to/from client devices within the premises network.

Any number of different data flows may occur within the premises network. For example, the CPE 106 may exchange digital telephone signals from the CMTS 199 which are further exchanged with the telephone unit 222 or the Wi-Fi phone 224. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The premises network may also interface with a cellular or other wireless system, such as for example a 3G/4G IMS (IP multimedia subsystem) system, in order to provide multimedia calls between a user or consumer in the household domain 140 (e.g., using a SIP phone or H.323 terminal) and a mobile 3G/4G telephone or personal media device (PMD) user via that user's radio access network (RAN). See, e.g., co-owned and co-pending U.S. patent application Ser. No. 11/258,229 entitled "Method And Apparatus For On-Demand Content Transmission And Control Over Networks" filed Oct. 24, 2005, incorporated herein by reference in its entirety, wherein media can be streamed between a mobile unit and the CPE 106, including optionally in an on-demand or session-based fashion.

The CPE 106 may also exchange Internet traffic (e.g., TCP/IP and other packets) with the CMTS 199 which is further exchanged with the Wi-Fi-enabled laptop 226, the PC 232, or other device by way of a diplexer 230 and the exemplary coax bridge 231. CPE 106 may also receive digital programming that is forwarded to the DVR 228 or to the television 234. Programming requests and other control information may be received by the CPE 106 and forwarded to the CMTS 199 as well. The CMTS 199 routes the information to the corresponding subsystem within the headend 150 or to other systems located upstream from the CPE 106.

In the exemplary embodiment, a message server or comparable device is used as part of or is in communication with the CPE 106 (or an associated client device coupled thereto). In one embodiment, the message server comprises a software process running on the host CPE hardware environment, although it will be appreciated that other implementations (including discrete server hardware/software environments such as server blades or cards) may be used consistent with the present disclosure.

The exemplary CPE message server is capable communicating asynchronous messages with the CMTS 199 and the client devices of the premises network in a bandwidth-efficient manner without unnecessary delay. In one implementation, the client devices register with the message server using their private network addresses e.g., RFC-1918 IPv4 or link-local IPv6 addresses. When a client device e.g., Wi-Fi-enabled laptop 226, needs to send a message to another client device e.g., DVR 228, within the premises, the message server recognizes that the message is addressed to the DVR 228 and connects the message directly to the DVR 228 via the home network 104 without utilizing the CMTS 199 and associated headend network 150.

Additionally, the CPE 106 of the exemplary embodiment is allocated a publicly routable IP address, and includes a network address translator (NAT) process to provide Internet connectivity to the client devices via the CPE 106. The CPE's embedded or associated message server enables messages to be communicated between a content or service provider and the client devices via a single connection e.g., a single Internet connection, between the CPE 106 and the CMTS 199. The messages may include programming requests, control information, instant messages, "pub/sub" (publish/subscribe) content, EAS notifications, keepalive signals, etc. For example, at the request of client devices, the message server registers with content providers for specific broadcast messages (e.g., publish-subscribe broadcast messages) using the publicly routable IP address of the CPE 106 and performs the distribution of the messages to the client devices using their private network addresses.

For any Internet connections that need to be preserved for e.g., receiving content, the message server in one embodiment is configured to send a single keepalive or heartbeat message to a content provider via the CMTS 199, and also handles the keep-alive messaging from the local devices within the premises network (e.g., those issued by application layer processes). Such handling of the indigenous keep-alive messaging includes in one exemplary implementation a "coincidence" type logic for each individual network content provider or target. Specifically, the message server process of the CPE is configured to receive any such keep-alive messages from any client device (or associated process running thereon, such as a messaging stream as part of an application program running on the client), and to the degree that a given network target or connection is required by any of the communicating clients/client processes, a single network or transport-layer keepalive message is generated by the CPE message server and transmitted upstream to e.g., a corresponding application server.

As previously referenced, the message server functionality can be a software process operative to run on the host CPE environment, made part of a separate physical (yet integrated component such as a sever card or blade), or alternatively have some or all of its functionality disposed within other devices in data communication with the CPE (e.g., another computerized device on the premises LAN). It may also be integrated with other devices (such as connected client devices or PMDs) as previously noted.

To enable this functionality, the message server may include or have access to a client device registry or other type of registry; see e.g., co-owned U.S. Pat. No. 8,302,111 entitled "METHODS AND APPARATUS FOR HARDWARE REGISTRATION IN A NETWORK DEVICE", and U.S. Pat. No. 9,083,513 entitled "TECHNIQUE FOR SECURELY COMMUNICATING AND STORING PROGRAMMING MATERIAL IN A TRUSTED DOMAIN", each incorporated herein by reference in their entirety, for exemplary types of registry configurations that may be used consistent with the present disclosure. The client device registry in the exemplary embodiment contains records that correspond to the client devices within the premises network. Each record (or set of records) may contain fields that: (i) identify the client device (e.g., the private network address of the device), (ii) identify content or service providers with which the client device is registered to receive messages, (iii) identify content or service providers with which the client device needs to preserve an open connection, and/or (iv) identify information channels that the client devices are subscribed to receive information.

The CPE's indigenous message server uses the information in the registry to route messages received from outside and within the premises network. For example, when a message, content, or information arrives at the message server from outside the premises network, the message server accesses the registry to identify the client device(s) to which the message, content, or information should be forwarded. In cases where the message is destined for the message server (as opposed to a particular client device, such as where the server issued a keepalive message on behalf of several clients within the premises network), various approaches may be implemented, including e.g., maintaining an association table (AT) or other data structure within the CPE message server that associates connections/processes with one or more client devices, such that when a connection-related message is received and is addressed merely to the CPE message server, the AT can be consulted to forward the received message (if necessary) to the appropriate client devices/processes associated with the connection.

When the message server receives a keep-alive message from a client device, the message server uses the registry to determine which content or service provider should be notified at the predetermined interval (or occurrence of other triggering event, such as a change in status in the CPE 106 local hardware registry indicating e.g., inactivity) to preserve or terminate the connection between the content or service provider and the CPE 106, for the client device to receive (or discontinue receiving) data.

In another embodiment, an entity or process of the headend network 150 (e.g., a remote messaging server), the CPE 106, and the client devices may be configured to communicate messages using a predefined message format which includes "routing" information. The message format may contain, inter alia, information that identifies: (i) one or more source entities of the message and/or (ii) one or more destination entities of the message. The CPE message server and the headend network entity uses the information contained in the message to route the messages to the appropriate destination entities, and to send response messages to the appropriate source entities. For example, when a message arrives at the message server from outside the premises network (e.g., via the aforementioned DOCSIS modem connection to the CMTS), the CPE message server reads the information in the message identifying the destination entities, and forwards the message to the specified client devices.

As another example, when the message server receives a keep-alive message from a client device within the premises network, the CPE message server reads the information in the message identifying the destination entity and notifies the specified content/service provider at the predetermined interval to preserve a connection (which may be a connection separate from the keepalive message e.g., a unicast video stream) between the content/service provider and the CPE 106 for the client device to receive data. The content/service provider may read the information in the message identifying the source entity to determine which connection needs to be preserved.

As yet another example, when the message server receives a message from one client device with the destination entity field identifying another client device, the message server forwards the message directly to the other client device via the premises network.

It will also be recognized that aspects of the present disclosure may be used in conjunction with a number of different capabilities and features useful with traditional (prior art) CPE. For example, the error logging and reporting methods and apparatus described in co-owned and co-pending U.S. patent application Ser. No. 10/722,206 entitled "METHODS AND APPARATUS FOR EVENT LOGGING IN AN INFORMATION NETWORK" FILED Nov. 24, 2003, which is incorporated herein by reference in its entirety. For example, the aforementioned disclosure describes methods and apparatus (including APIs) for logging errors that occur on client devices or CPE 106. In the present context, these errors can then be transmitted upstream to a responsible entity (e.g., management node, conditional access server, etc.) for further analysis or correction in accordance with the techniques described herein. Such logging events may also be aggregated by the CPE message server as appropriate; e.g., collected over a prescribed period of time for one or more client devices within the premises network and sent via a single communication to one or more responsible network or other entities.

In another aspect, the CPE 106 of the present disclosure may also be made compatible with the methods and apparatus disclosed in U.S. patent application Ser. No. 11/363,578 filed Feb. 27, 2006 and entitled "METHODS AND APPARATUS FOR SELECTING DIGITAL ACCESS TECHNOLOGY FOR PROGRAMMING AND DATA DELIVERY", which is incorporated herein by reference in its entirety. Specifically, electronic devices such as set-top boxes, PMDs, or other types of equipment containing one or more hardware and software functions or modules are in data communication with the CPE message server; the hardware and software functions/modules of the different devices on the network contain various capabilities and options, including conditional access capabilities, video coding or compression capabilities, encryption schema, and network interfaces. These capabilities are utilized as a basis for determining which conditional access, coding, encryption, and/or network interfaces to utilize for delivery of content to each particular client device, such capabilities being maintained in a CPE client device "capabilities" registry or other data structure. The CPE message server or other component of the CPE can accordingly be equipped with such capability if desired in order to, inter alia, profile the CPE clients for tailoring content or other functions to that specific end-user environment. For example, if a connected client devices of the CPE (e.g., legacy DSTB, PC or the like) has only an MPEG-2 decoder, only MPEG-2 encoded content would be sent to that client device based on the registry maintained by the CPE, or alternatively the CPE or client devices would obtain the necessary codec (e.g., MPEG-4 or Real) from another source, such as an MSO or third party website. Hence, the CPE master device capabilities registry can be used for communicating messages to relevant network entities as a proxy for the affected client(s).

Exemplary CPE—

Figure 3:
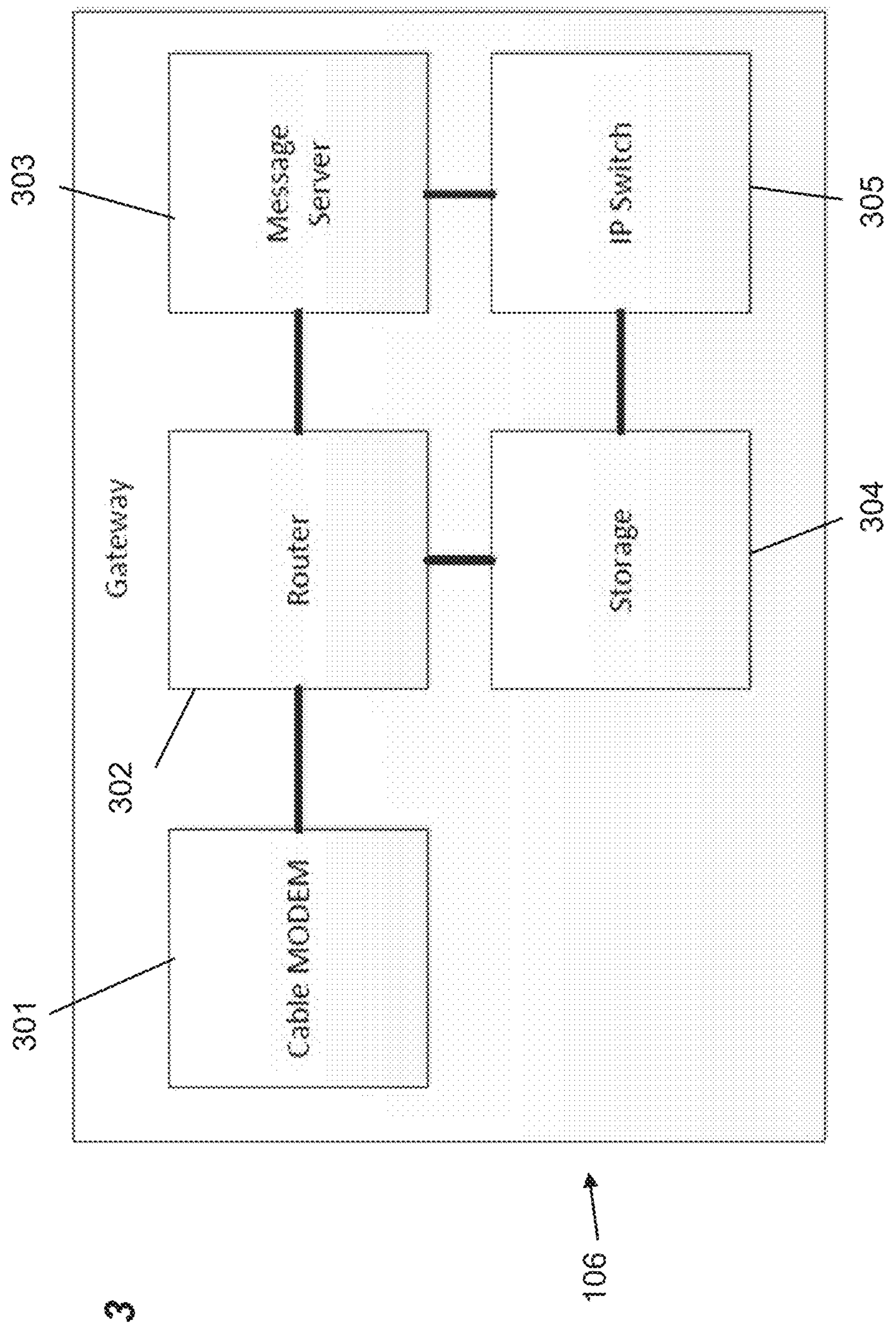
FIG. 3 is a conceptual block diagram of an exemplary CPE with message server and router functionality in accordance with one embodiment of the invention.

FIG. 3 is a conceptual or logical block diagram of an exemplary CPE 106 (here, a gateway device) according to the present disclosure. The gateway includes a network interface (e.g., DOCSIS modem) 301, router 302, IP switch 305, storage device 304, and message server 303. In operation (and as described elsewhere herein), the message server 303 acts to control routing of messages originated within the premises network, as well as those originated outside of the premises network and directed to entities within the premises network (or the gateway itself) according to the designated message protocols (e.g., XMPP/Secure WebSockets) and addressing. Switching of Internet Protocol (IP) packets within the premises network is performed by the IP switch.

In one embodiment, the message server 303 provides an OSI layer 7 (application layer) message protocol for communications between clients connected via an OSI layer 2 or 3 switch 305 and external application servers (e.g., e.g., server 104 of FIG. 1, or server 190 of FIG. 1*c*). As push technology (e.g., long-polling, Web Sockets, etc.) typically requires a TCP socket to be kept open with "keepalive" messages sent within the socket time-out, the message server 303 maintains the open TCP connection between multiple clients and itself, while only maintaining a single connection to the application server via long-duration TCP keepalive interval.

The message server 303 of the exemplary embodiment also provides a mechanism for clients to register for specific types of messages. This "publication-subscription pattern" allows, inter alia, clients to subscribe to messages relevant to them; e.g., a display client registering for video program time updates, such as when sports broadcasts run into overtime and multi-zone building temperature controls registering for temperature control messages via the Internet. Similarly, in another example, a set-top box, smart TV or other device may register for remote-control messages (e.g., a remote used in conjunction with the set-top or a rendering device such as the smart TV). A remote-control could then send a message ("publish") to the Message Server 303, and it would then forward the message to the registered set-top boxes. As another example, a building with intelligent multi-zone temperature control valves could have the control valves register to receive messages from a central thermostat control that would send messages (such as for example, that it is presently a given time of day such as morning or evening, and the valves should adjust the temperature in all areas in preparation for people entering or departing the building). Numerous other applications will be recognized by those of ordinary skill given the present disclosure.

Figure 3A:
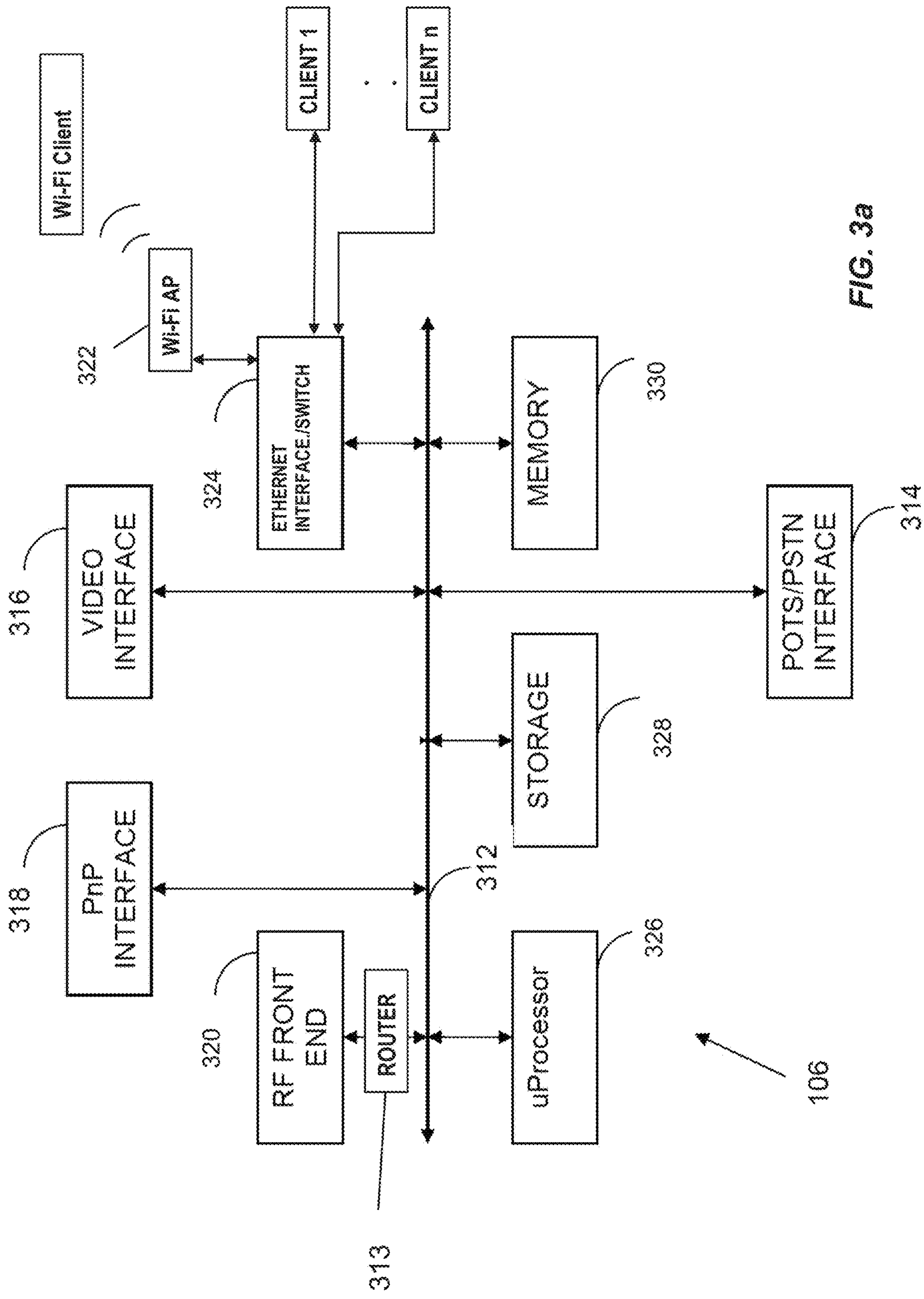
FIG. 3*a* is a functional block diagram of an exemplary implementation of the CPE of FIG. 3.

FIG. 3*a* is a block diagram of one exemplary implementation of the CPE 106 (including "proxy" message server) of FIG. 3. The exemplary CPE 106 includes an RF front end 320, Wi-Fi interface 322, video interface 316, "Plug n' Play" (PnP) interface 318, and Ethernet interface 324, each directly or indirectly coupled to a bus 312. The microprocessor 326, storage unit 328, plain old telephone service (POTS)/public switched telephone network (PSTN) interface 314 (described in greater detail subsequently herein), and memory unit 330 are also coupled to the exemplary bus 312. The memory unit 330 typically comprises a random access memory (RAM) and storage unit 308 typically comprises a hard disk or solid-state drive, an optical drive (e.g., CD-ROM or DVD), NAND flash memory, or some combination thereof.

A network router 313 is also included within the exemplary CPE 106 and in communication with the bus 312 and the network interface (e.g., DOCSIS modem) 320 so as to enable, inter alia, local routing of OSI layer 3 traffic within the premises LAN to the external WAN as a network gateway as well as providing Network Address Translation (NAT) to incoming/outgoing traffic OSI layer 3 traffic. Hence, in the exemplary embodiment, the router still behaves as a destination for IP addresses not found within the network. In one variant, the Ethernet interface 324 comprises an Ethernet switch with multiple clients attached, including the Wi-Fi AP/interface 322. The exemplary switch allows OSI layer 3 (MAC address) routing between devices connected to the switch via e.g., the Ethernet interface 324 and the Wi-Fi interface 322. The CPE 106 also optionally may include a network processing unit (e.g., network processor, not shown) to process the premises or home network (e.g., PLAN) services. The network processor also provides in one embodiment the ability to download firmware updates via TFTP or another selected protocol as desired.

The illustrated CPE 106 can assume literally any discrete form factor, including those adapted for desktop, floor-standing, or wall-mounted use, or alternatively may be integrated in whole or part (e.g., on a common functional basis) with other devices if desired.

It will be recognized that while a linear or centralized bus architecture is shown as the basis of the exemplary embodiment of FIG. 3*a*, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. A daisy-chained or "ring" topology may also be used.

Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

It will also be recognized that the CPE configuration shown is essentially for illustrative purposes, and various other configurations of the CPE 106 are consistent with other embodiments of the invention. For example, the CPE 106 in FIG. 3*a* may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, HDMI, DVI-D, Thunderbolt, DisplayPort, or other integrated data interfaces, etc.

Standard 10/100/1000 Base T Ethernet ports for the purpose of a Home LAN connection are provided; however, it will be recognized that other rates (e.g., 10-Gig-E) and local networking protocols (e.g., X.25, etc.) may be used. These interfaces may be serviced via a WLAN interface, wired RJ-45 ports, or otherwise. The CPE 106 also includes a plurality of RJ-11 ports for telephony interface, as well as a plurality of USB (e.g., USB 2.0/3.0) ports, and IEEE-1394 ports. S-video and other signal interfaces may also be provided if desired.

The CPE 106 mass storage device 328 of the illustrated embodiment comprises a Serial-ATA (SATA) or other hard disk drive solid state storage device (SSD) for the operating system and content storage, although other configurations RAID arrays may be used for this purpose. The CPE 106 hard disk is preferably removable without the need for tools, and the CPE 106 is also configured to allow for an external USB (e.g., USB 2.0/3.0) drive to be attached and automatically added to the existing storage. It will also be appreciated that USB keys of the type well known in the art can be used consistent with the USB port(s) of the CPE 106, so as to make the data storage device highly mobile and of very small size.

The RF front end 301 of the exemplary embodiment comprises a cable modem (CM) of the type known in the art. In this fashion, content or data normally streamed over the CM can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment (or outside this environment by way of a gateway or portal) via, e.g. the Wi-Fi interface 322, Ethernet interface 324 or PnP interface 318.

It will be appreciated, however, that the RF front end 301 of the CPE 106 may comprise (either in addition to or in place of the CM) a traditional video RF front end 320 (e.g., tuner) adapted to receive video signals over, e.g., a QAM. For example, one exemplary embodiment of the RF front end 320 comprises one or more tuners, a demodulator, decryption module, and demultiplexer of the type well known in the art, although other configurations may be used. Additionally, the RF front end 320 modulates, encrypts/multiplexes as required, and transmits digital information for receipt by upstream entities such as the CMTS or a network server. Digital data transmitted via the RF front end 320 may include for example MPEG-2 encoded programming data that is forwarded to a television monitor via the video interface 316. Programming data may also be stored on the CPE storage unit 328 for later distribution or output by way of the video interface 316, or using the Wi-Fi interface 322, HDMI, DVI-D, Ethernet interface 324, IEEE Std. 1394, USB/USB2/USB3.0, or any number of other such options.

Programming and other types of data including messages, pictures, video, music or MP3 files, software applications, metadata files, etc. may also be received by way of the various digital interfaces in the CPE 106. These data may be stored locally (e.g., in the CPE storage unit 308) and/or forwarded to a client device or network agent in communication with the CPE 106.

In accordance with the exemplary embodiment of the invention, the CPE 106 includes a DOCSIS cable modem for delivery of traditional broadband Internet services. This connection is preferably shared by all Internet devices in the premises; e.g. IPTV devices, PCs, laptops, tablets, smartphones, etc. In addition, the CPE 106 can be remotely managed (such as from the head end 150, or another remote network agent) to support IP services such as DHCP, DNS, NAT and firewall capabilities as well as anti-virus, pop-up blocking, and spyware protection.

The CPE 106 may also create a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, one embodiment uses frequencies on the order of 1150 MHz to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 2 and 3 acts as a Wi-Fi access point (AP), thereby allowing Wi-Fi enabled devices (e.g., 12 in a typical configuration) to connect to the home network and access Internet, media, and other resources on the network. It will be recognized, however, that the CPE 106 may also act as a slave or station (STA) within an ad hoc or other Wi-Fi network, such as where another device on the premises 140 acts as the AP. Two devices may also utilize so-called "Wi-Fi Direct" functionality for direct (e.g., one-to-one) ad hoc networking. The CPE 106 can include this Wi-Fi capability in a dedicated radio suite (e.g., one or more ICs or ASICs), as part of a larger SoC device, as a Wi-Fi card, or even as an external device that communicates with the CPE 106 or other associated device via a cable or similar connection.

An optional DHCP server running on the CPE 106 manages IP address generation and dissemination on the coax, Wi-Fi, and other local networks in communication with the CPE 106. The cable modem (e.g., DOCSIS) interface of the exemplary embodiment is set to DHCP, and obtains an IP address from the CMTS DHCP server on the appropriate DOCSIS channel.

Internet and Wi-Fi phone traffic is preferably routed from both the coax and Wi-Fi interfaces to the cable modem interface. The CPE 106 also includes the means (e.g., a software module) for doing network address translation (NAT) of the Wi-Fi and coax interfaces, although it will be appreciated that other approaches to address management may be used as well.

During operation of the CPE 106, software located in the storage unit 328 is run on the microprocessor 336 using the memory unit 330 (e.g., a program memory within or external to the microprocessor). The software controls the operation of the other components of the system, and provides various other functions within the CPE. Other system software/firmware may also be externally reprogrammed, such as using a download and reprogramming of the contents of the memory, replacement of files on the storage device or within other non-volatile storage, etc. This allows for remote reprogramming or reconfiguration of the CPE 106 by the MSO or other network agent.

In one embodiment, the microprocessor 326 executes a messaging application or software suite to configure the CPE 106 to act as a message server for the premises network. As previously discussed, the message server allows, inter alia, for a content/service provider to communicate with client devices via the CPE 106 using a single connection. The message server maintains a single connection to the content/service provider for communications between the content/service provider and all client devices in the premises network. The foregoing approach is particularly useful in the content of IP or similar "multicast" or broadcast messages (e.g., pub/sub content or EAS notification) that are targeted for multiple client devices. Under the prior art, multicasting or broadcasting of such messages would consume significant amounts of bandwidth on the downstream channels, since the message was essentially replicated for each different client device and sent unicast from the content/service provider to each different client device. In contrast, the improvements provided by the present invention allows a content/service provider to deliver messages to multiple client devices connected to the CPE 106 by sending a single message to the CPE 106 which then replicates and multicasts or broadcasts the message to the client devices, thereby allowing for a 1:N communication of the message with minimal if any replication at the headend.

Similar, the CPE 106 allows for N:1 communication of messages between client devices and a content/service provider. For example, the message server can combine messages (e.g., keep-alive messages and subscription messages) received from client devices targeted for a content/service provider into a single message communicated to the content/service provider. Under the prior art, each different client device would send its own message to the content/service provider, resulting in unnecessary consumption of bandwidth on upstream channels.

It will also be appreciated that the inventive message server of the CPE can be configured for N:N communication if desired. For instance, consider the case where a plurality of client devices within a given premises network are connected to a corresponding number of different content sources/processes through the CPE 106. Keep-alive messages may be required for each of these different services. Rather than send individual messages originated from each client to each of the respective processes, the CPE message server may be configured to aggregate the keep-alive messages issued by each individual client process, and send a single multicast message to each of the target content sources or processes, which in certain case may have economies of scale over sending a plurality of unicast messages individually, as in the prior art. For instance, the message server may schedule the common multicast at a time when upstream network bandwidth is not (or is less) constrained. In another approach, the message server may be configured to send a single message to a node further upstream within the network (e.g., closer to the core), such node from which a subsequent multicast to each of the content sources is generated. The message may include as part of its payload or other structure information on each of the destinations. In this fashion, the individual messages of the multicast are carried for a shorter "distance" within the network topology, thereby ostensibly reducing network congestion. By analogy, a car carrier which travels to a given city and then unloads each of its cars for delivery in that city may have economies as compared to having individuals drive each car from an origin to the city separately. This approach is useful where a common message type/content is used for each of the constituent clients (e.g., where all are attempting to transmit the same "keepalive" message upstream, such as to keep a connection open). In one variant, the methods and apparatus described in U.S. Pat. No. 8,681,645 entitled "System and method for coordinated discovery of the status of network routes by hosts in a network" issued Mar. 25, 2014 and incorporated herein by reference in its entirety, may be used consistent with the present disclosure to provide the aforementioned functionality (e.g., so-called "cluster groups" with one or more master nodes can be utilized for, inter alia, aggregation or inter-device messaging and status).

The message server also allows for bidirectional device to device communication within the premises network. When a client device requests to communicate with another premises device via the premises network, the message server may present to a user of the client device a list of currently registered premises devices with which the client device can communicate. The user of the client device may select the device from the list, and the message server directly communicates messages from the client device to the selected device. In some embodiments, the client device and selected device may be paired (e.g., in the case of a client running a remote control application communicating with a DVR) for ongoing bidirectional communication. By including the message server in the CPE 106, the transport distance for messages, particularly IP messages, between the client devices is minimized and thus the propagation delay is minimized.

The message server may use an appropriate protocol for communicating messages. For example, in one exemplary embodiment, the message server uses the Extensible Messaging and Presence Protocol (XMPP) on top of the Secure Websockets (WSS) protocol. Each client device may be initialized and authenticated for messaging using a token issued by the message server or headend network and other credentials (e.g., device identifier). Each client device is assigned a private network address as an addressable end point in the premises network.

The message server may store a client device registry in the storage 308, as previously discussed. The client device registry contains records that correspond to the client devices within the premises network as described above. In some embodiments, when the message server receives a message, the message server accesses the storage 308 to retrieve the client device registry and uses the information in the registry to route the message.

Exemplary Methodology—

Figure 4:
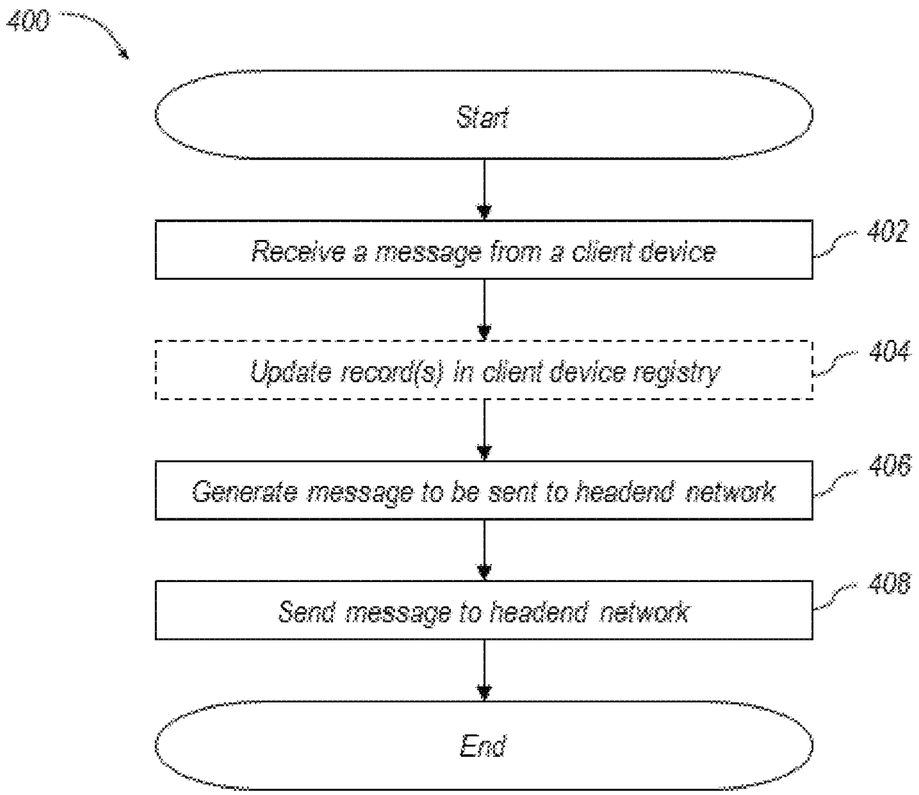
FIG. 4 is a logical flow diagram illustrating an exemplary embodiment of a method for upstream communication of data using the CPE of FIG. 3.

Referring now to FIG. 4, an exemplary embodiment of a method 400 performed by a premises device e.g., CPE 106 of FIGS. 2 and 3, for upstream communication of data e.g., an asynchronous message, from a client device to a content/service provider, is shown. The client device is registered with the CPE 106 and is assigned an identifier on the premises network. The client device may also be associated with a record in the aforementioned client device registry.

At step 402, the CPE receives a message from a client device. The message may contain e.g., a programming request, control information, a subscription request, and/or a keep-alive notification. The message may contain an identifier of the content/service provider to which the message is targeted (e.g., a URL or other network address).

Based on the information contained in the message, the CPE may update record(s) in the client device registry (step 404). For example, if the message contains a subscription request, the CPE updates a record associated with the client device to indicate that the client device has subscribed to content from the content provider. The record can be updated with subscription information identifying the content provider, specific channels of content, and/or the attributes/category of the content. When the CPE receives a message from the content provider that satisfies the subscription information in the record, the CPE forwards the message to the client device. The CPE thus in one aspect acts as a message filter for publish-subscribe messages directed to the client devices.

At step 406, the message server process of the CPE generates the message to be sent to a network entity (e.g., to the headend network of the content distribution network previously described with respect to FIGS. 1-1*e*) for delivery to the content/service provider, the latter which may or may not be within the content delivery network. In some embodiments, the generated message contains information identifying the client device and/or a connection (e.g., a unicast connection for streaming audio/video) established between the client device and the content/service provider. For example, if the message contains a programming request or a keep-alive notification, the CPE may generate the message to include information identifying the client device or information identifying the connection associated with the programming request or keep-alive notification. When the content/service provider receives the message from the CPE, the content/service provider uses the information to maintain the connection or to change content provided to the client device over the connection.

At step 408, the CPE sends the generated message to the recipient; e.g., via the headend of the network. The CPE may send the message over an in-band or OOB channel, such as via a TCP (transport control protocol) connection depending on the interfaces and protocols of the destination device.

In some implementations, the CPE may combine information from messages received from multiple client devices as previously discussed. For example, the CPE may receive keep-alive messages from multiple client devices before the predetermined time period for sending a keep-alive message to the content/service provider has expired (e.g., before expiration of the earliest or most stringent time period has expired). For instance, a first message may have an expiration in t=30 sec. from receipt, in which case the CPE message server logic may hold off generation and transmission of its message until the 30 sec. limit is approached, so as to aggregate other messages which may be received within that window from other client devices (and which will not expire during that window), so as to enable transmission of a common keep-alive message.

The CPE may also combine the information extracted from the keep-alive messages received from the client devices to generate a single keep-alive message to be sent to the content/service provider. The generated keep-alive message contains information associated with each client device e.g., a client device identifier and/or a connection identifier. The content/service provider extracts this information from the message to manage the connections for the multiple client devices.

In some implementations, the CPE may forego sending a message to the headend network. For example, the CPE may receive a subscription message from a first client device, e.g., a laptop computer, specifying a content provider and a category of content. The CPE updates the client device registry information to reflect the subscription. The CPE generates and sends a message to the content provider indicating that the CPE has subscribed to the content indicated in the message. Subsequently, the CPE receives a subscription message from a second client device, e.g., a handheld mobile device, subscribing to the same content as the first client device. The CPE updates the registry information to reflect that the second client device has also subscribed to the content. Because the CPE has previously subscribed to the content, the CPE foregoes sending a message to the content provider relating to the second device, since the "subscription" has already been established for an entity within that premises network. When the CPE receives published messages from the content provider, the CPE forwards the messages to both the first client device and the second client device in accordance with the information in the client device registry.

Figure 5:
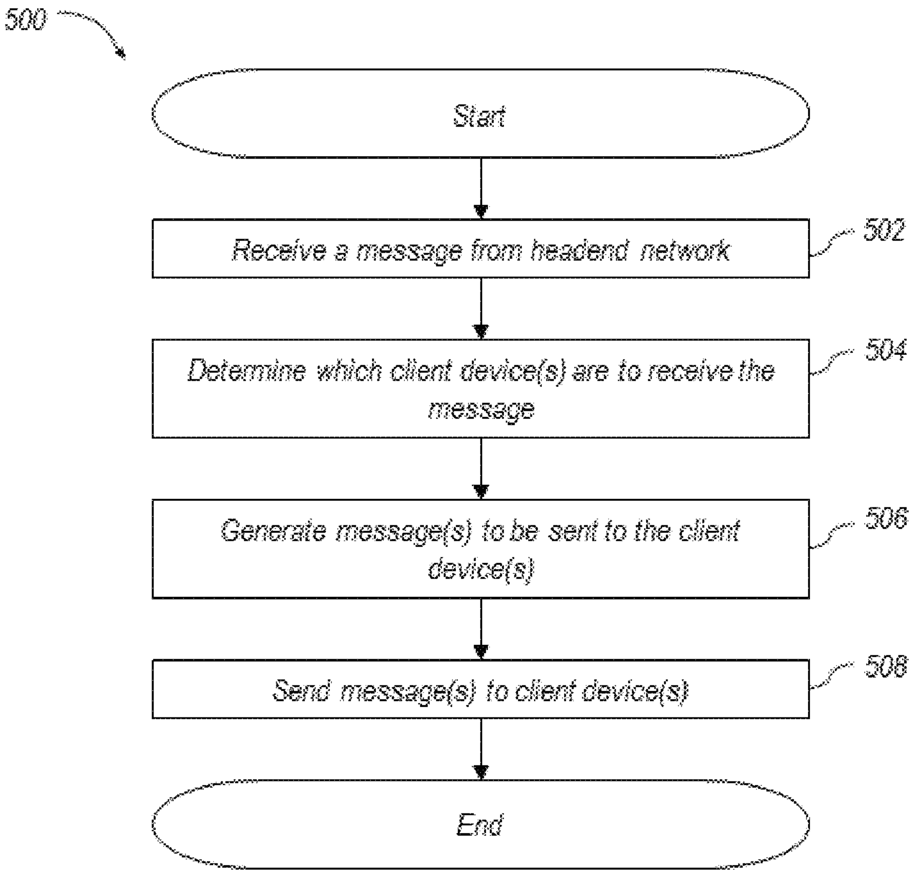
FIG. 5 is a logical flow diagram illustrating an exemplary embodiment of a method for downstream communication of data using the CPE of FIG. 3.

Referring now to FIG. 5, an exemplary embodiment of a method 500 performed by a premises device e.g., CPE 106 of FIGS. 2 and 3, for downstream communication of data e.g., an asynchronous message, from a content/service provider to a client device is shown.

At step 502, the CPE receives a message from the headend network. The message may contain e.g., publish-subscribe content, an EAS notification, or control information.

At step 504, the CPE determines which client device(s) are to receive the message. In some embodiments, the message contains identifiers of specific client devices to which the message is targeted. For example, a message with control information may contain information identifying a specific device to which the control information applies (such as via unique MAC address or other identifier). In another embodiment, the CPE may consult the client device registry to determine distribution of the message, such as based on message type (e.g., only Clients A, C, and E are capable of or support that type of message protocol), and hence client-specific information in the message is obviated.

In yet other embodiments, the CPE may determine that the message is to be broadcast to all client devices. For example, the CPE may determine that an EAS notification is to be broadcast to all client devices connected to the CPE (e.g., via a designation in the registry that all clients are to receive EAS messages regardless). In yet other embodiments, the CPE accesses the client device registry to determine where to send the message based on e.g., prior subscription. For example, when the CPE receives a publish-subscribe message addressed to only the CPE, the CPE searches the client device registry for records indicating which client devices subscribed to the message.

At step 506, the CPE generates the message(s) to be sent to the client device(s). The message may be generated using a format or protocol that can be interpreted by the client device (or where a given format or protocol is not common across all clients, via two or more formats or protocols). If the CPE determines that the message is to be sent to multiple client devices, the CPE replicates relevant portions of the message and inserts the relevant portions into the generated messages. For example, the message received from the headend network by the CPE message server process may include different control information for multiple client devices. The CPE may extract the information that is directed to a first device and include that information in the message generated for the first device, and extract the information directed to a second device and include that information in the message generated for the second device.

At step 508, the CPE sends the generated messages to the client devices. The CPE sends the generated messages by pushing the messages to the client devices via respective interfaces to the client devices.

Figure 6:
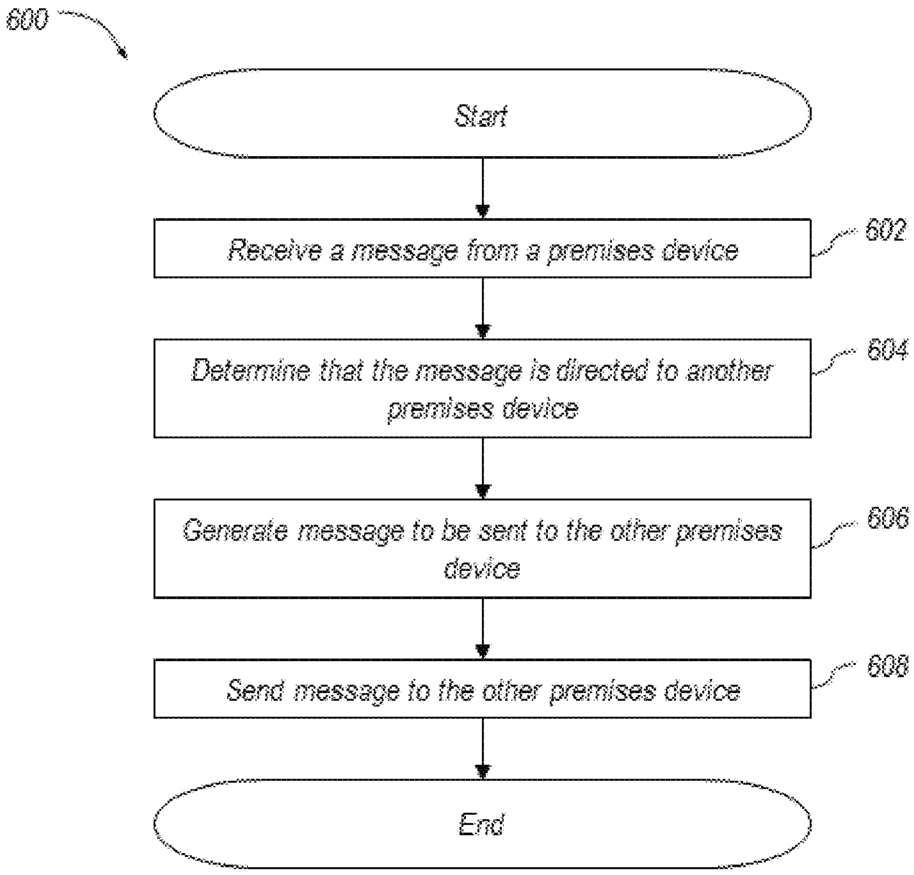
FIG. 6 is a logical flow diagram illustrating an exemplary embodiment of a method for communication of data between devices within a premises network using the CPE of FIG. 3.

Referring to FIG. 6, an exemplary embodiment of a method 600 performed by a premises device e.g., CPE 106 of FIGS. 2 and 3, for communication of data e.g., an asynchronous message, between premises devices is shown.

At step 602, the CPE receives a message from a premises device e.g., a remote control application running on a mobile device. The message may contain information for controlling another premises device e.g., a DVR, a STB, a home security camera, or a smart TV.

At step 604, the CPE determines that the message is directed to another premises device. In some embodiments, the CPE may determine this by extracting information from the message that identifies a destination device. The CPE may recognize that the information specifies a destination device that is within the premises network, such as by consulting a registry within the CPE listing all premises devices, or alternatively via an address falling within a specified address range or complying with a prescribed format. In other embodiments, the premises device sending the message may be paired with another premises device for ongoing communication (such as e.g., an open SIP or other session between processes running on the two devices). This pairing information may be stored in records of the client device registry associated with the paired devices. When the message indicates that it is a message directed to a paired device, the CPE may look up the pairing information for the message sender to determine which device is paired with the sender device.

At step 606, the CPE generates the message to be sent to the other premises device. The message may be generated using a format or protocol that can be interpreted by the other premises device. In some embodiments, a premises device may send one message that is to be forwarded to multiple premises devices. If the CPE determines that the message is to be sent to multiple premises devices, the CPE replicates relevant portions of the message and inserts the relevant portions into the generated messages. For example, the message received from the message sending device may include different control information for multiple other premises devices. The CPE may extract the information that is directed to a first premises device and include that information in the message generated for the first premises device, and extract the information directed to a second premises device and include that information in the message generated for the second premises device.

At step 608, the CPE sends the generated messages to the premises devices. The CPE sends the generated messages by pushing the messages to the premises devices via respective interfaces to the premises devices.

Figure 6A:
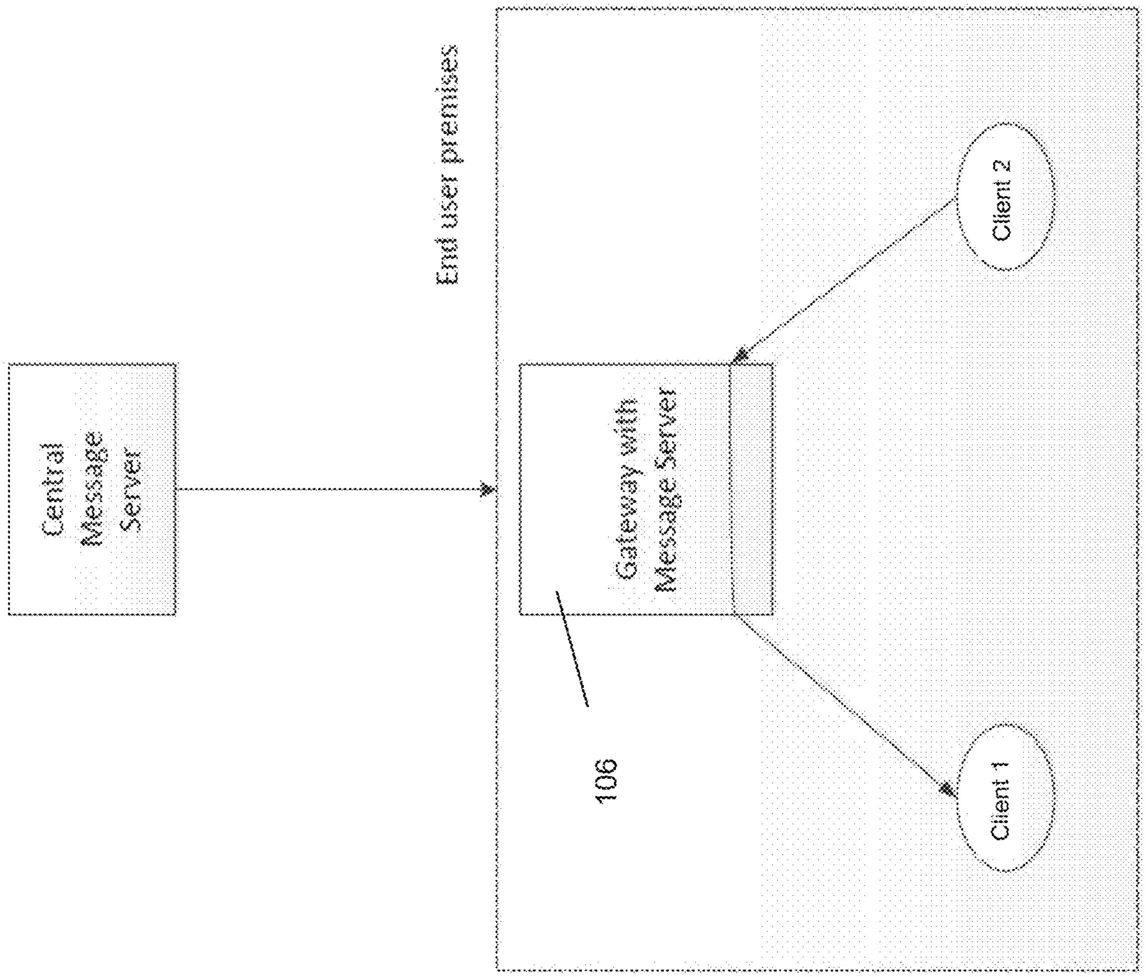
FIG. 6*a* is a conceptual block diagram of an exemplary CPE with message server and router functionality implementing the methodology of FIG. 6.

FIG. 6*a* is a conceptual block diagram of an exemplary CPE with message server and router functionality implementing the methodology of FIG. 6. As shown, the exemplary CPE 106 (see FIGS. 3-3*a*) routes the messages generated by one client device and destined for another client in the same network completely within the premises network, via the router 313 and message server process 303 as previously described. This obviates the aforementioned prior art "hairpinning" and issues associated therewith.

As one example of the foregoing, consider premises (e.g., home) automation functionality, such as for environmental control. In one such scenario, a user adjusts the central thermostat control of the premises (Client 2 in this example) to increase the overall temperature by 1 degree C. The central thermostat control sends a message to the CPE router 302, which sends it on to the CPE message server 303. The CPE message server recognizes the e.g., Layer 7 address to a publish/subscribe queue, and sends the message to such queue. Subsequently, all registered temperature control valves for the premises receive the message, as they were previously subscribed to that "topic"/queue.

Figure 7:
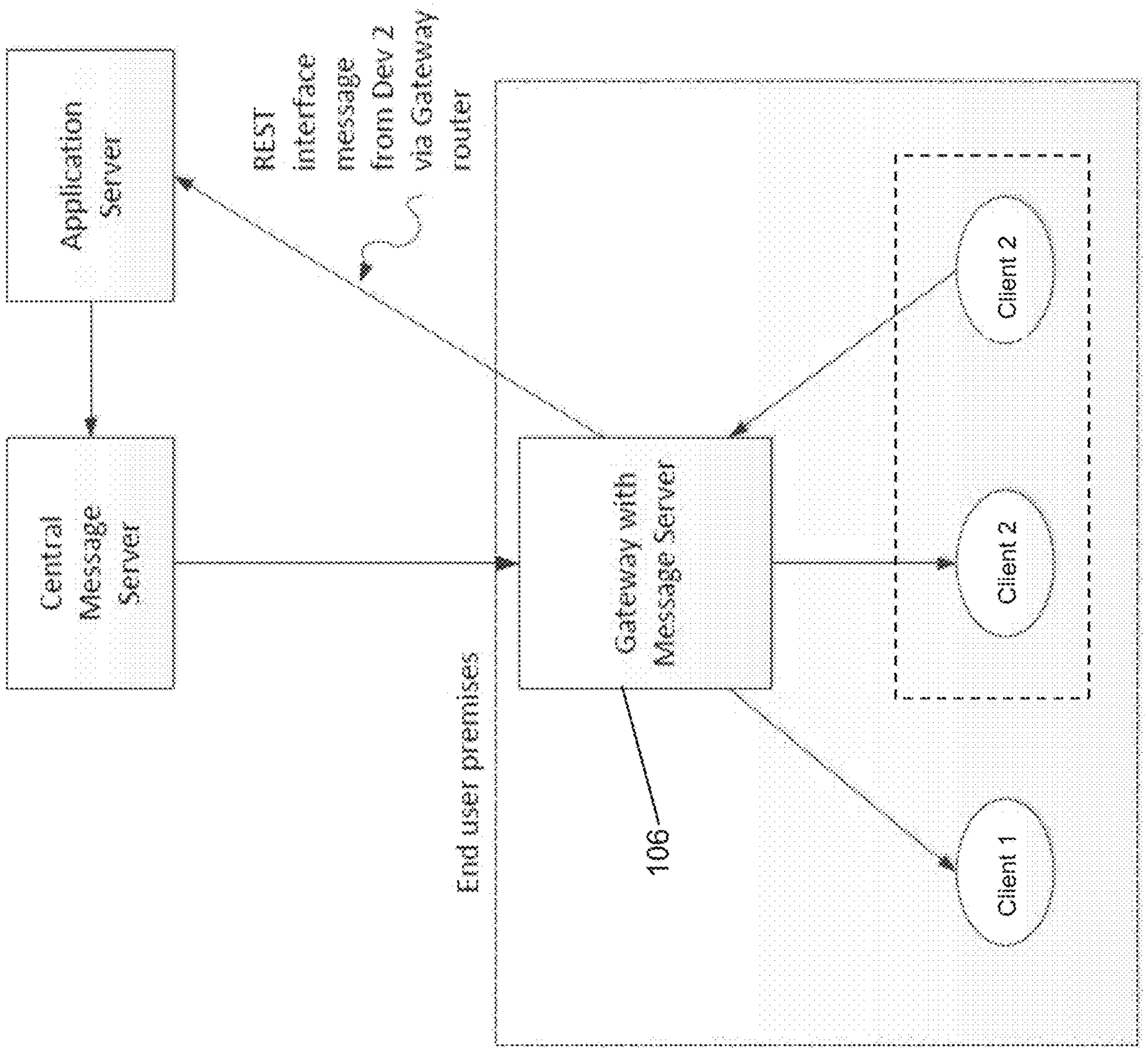
FIG. 7 is a conceptual block diagram of an exemplary CPE implementing an alternate methodology of message routing, wherein a message from a client device causes a network entity to push messages to other client devices within the same local network.
Figure 7A:
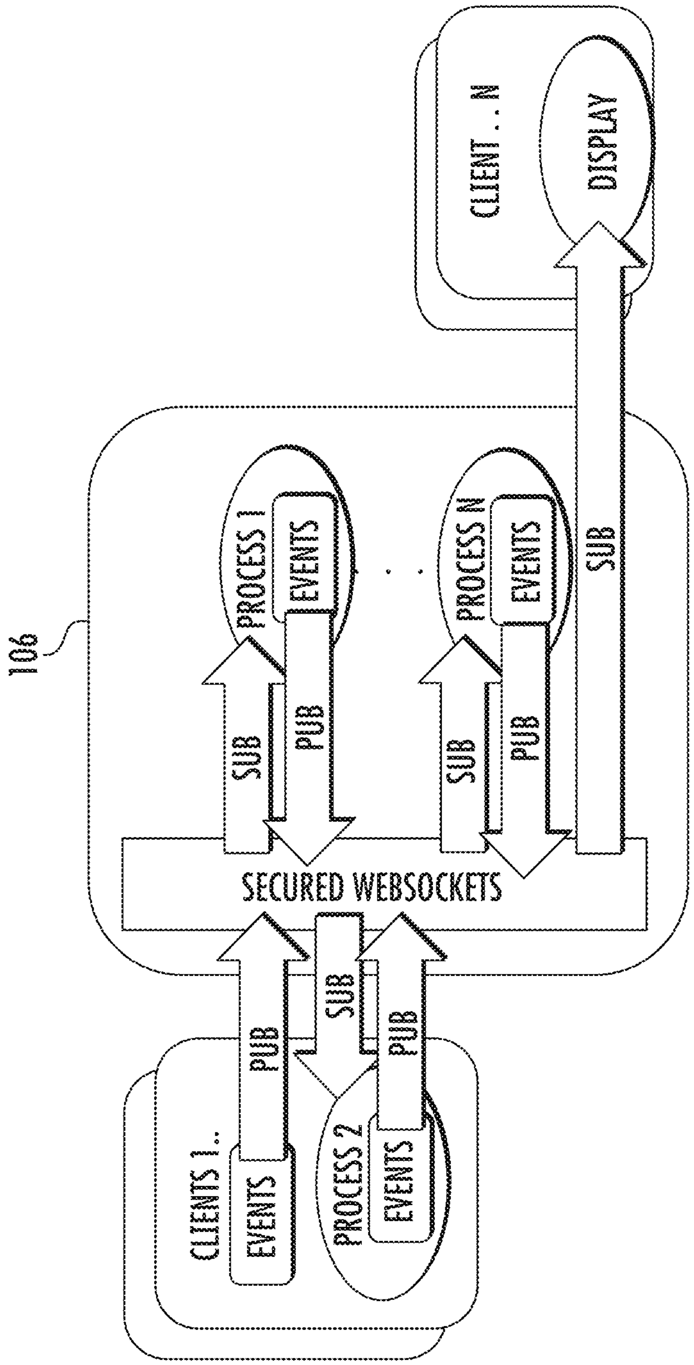
FIGS. 7*a*-7*d* illustrate various implementations of an exemplary logical architecture useful with the message server and premises device (e.g., gateway) of the present disclosure.
Figure 7B:
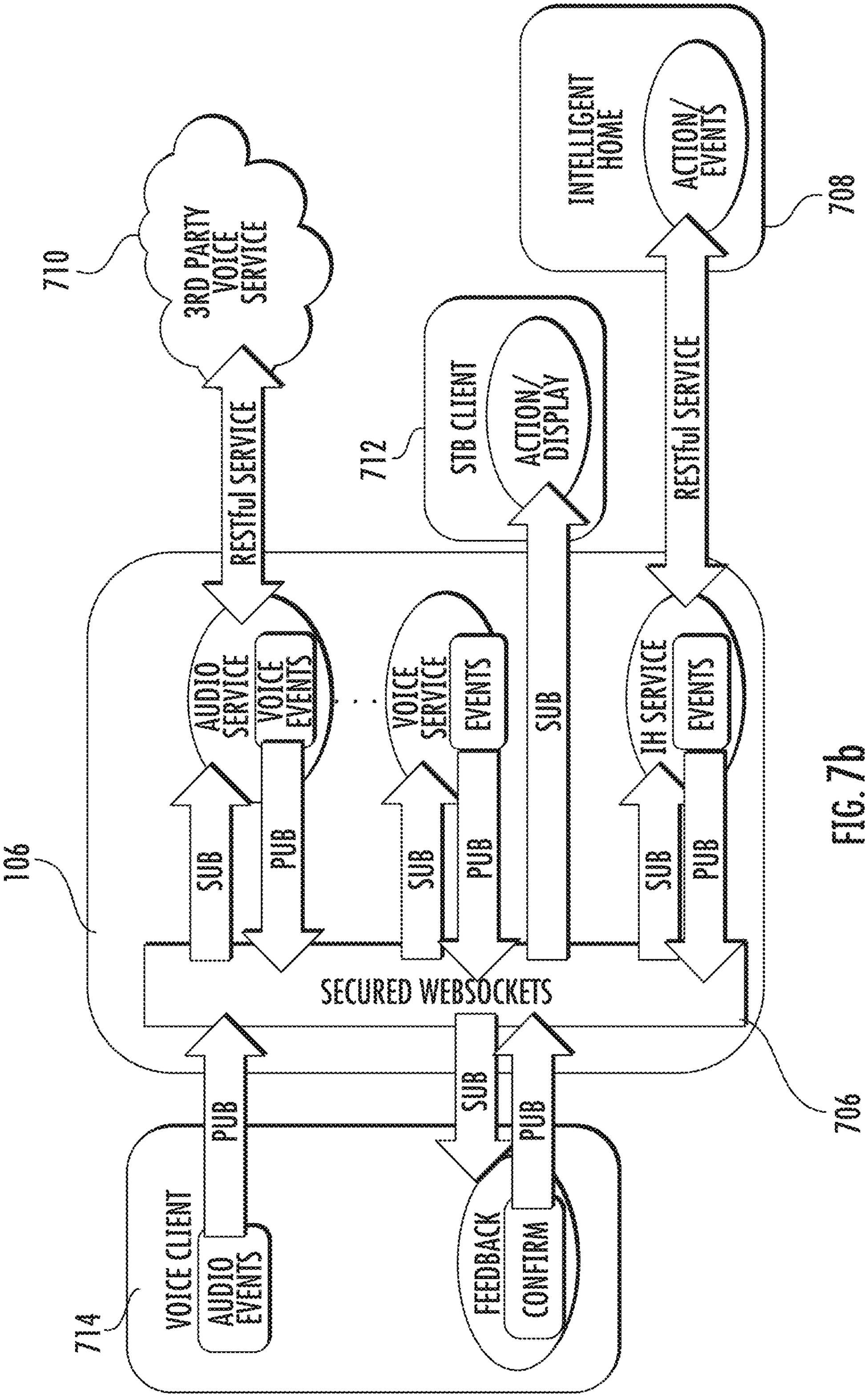
Figure 7C:
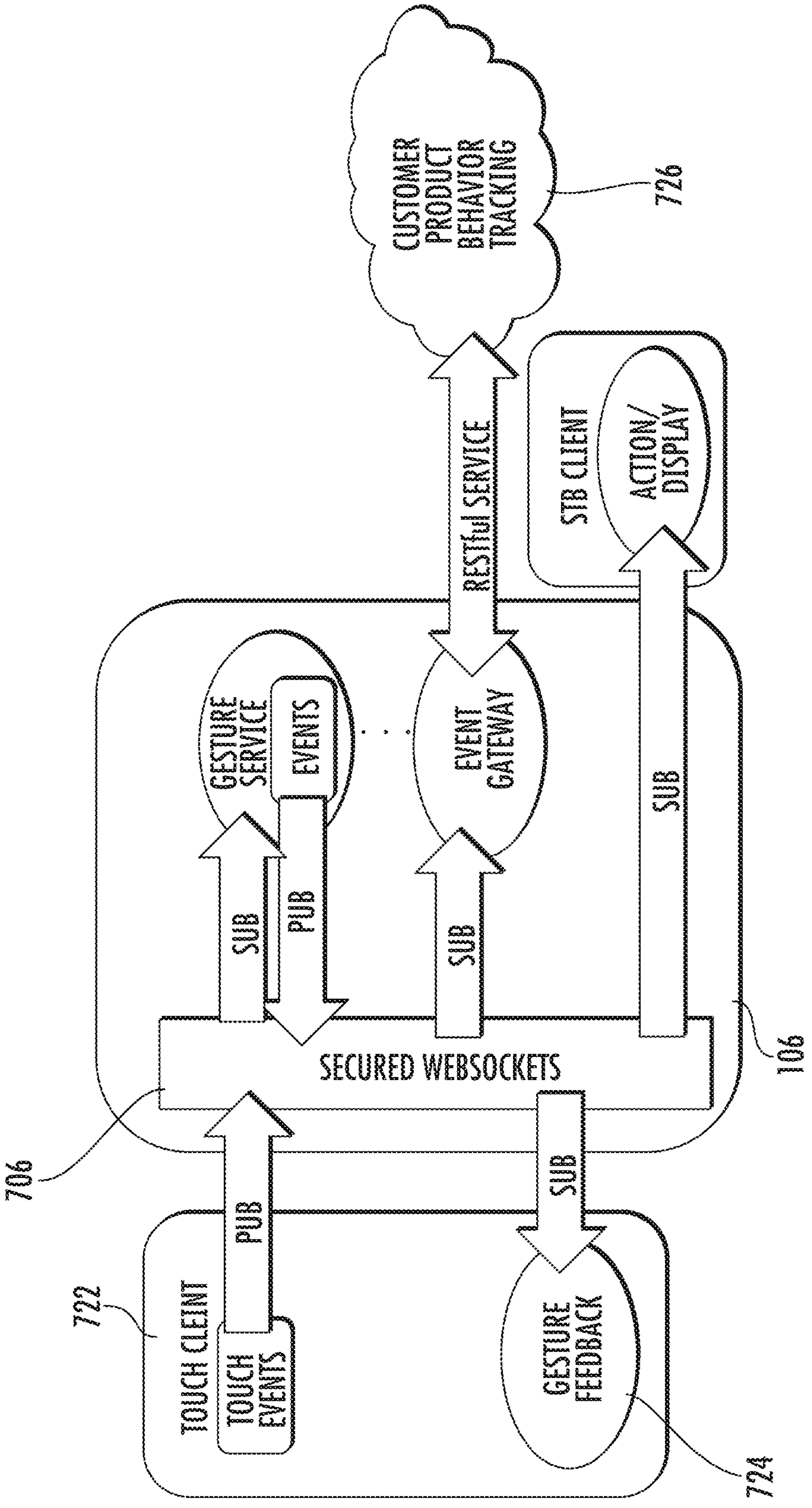

FIG. 7 is a conceptual block diagram of an exemplary CPE implementing an alternate methodology of message routing, wherein a message from a client device causes a network entity to push messages to other client devices within the same local network. Specifically, as shown, the client device (here, "Client 2") initiates a message (e.g., according to a Representational State Transfer (REST) or similar architectural model and associated constraints) to a remote application server 704 via the message server 303 and the router 302 of the gateway/CPE 106; the application server than communicates with the associated remote messaging process (e.g., central message server 706) to cause messages to be pushed to the other client devices of the premises network via the gateway/CPE 106 and message server process 303.

As one specific example of the foregoing, the client devices (Client 1 and Client 2 may be set-top boxes attached to displays that are each showing a grid of times and channels in which programs will be shown). Corresponding users are associated with each display in this example. Client 2 includes a remote control, and the application server is a cloud Digital Video Recorder (cDVR). When the user with the remote of Client 2 presses "record" (such as when their display is showing a highlight of a particular program on a particular channel), a message is generated and sent to the router 302 of the CPE 106 via e.g., the CPE switch, since the network address of the (remote) application server is not in the address table of the router (so no ARP response is given), and the client then sends it to the router network address. The router then forwards the message from the remote onto the next-hop router on the network (e.g., Internet) for delivery to the application server. The application server sets up the schedule to perform the recording, and then sends a message to the central messaging server (e.g., a "push notification" server), which may or may not be within the same MSO or other network), which sends the message back to the CPE router 302, which then sends it to the message server 303 in the CPE 106. Thereafter, the message is sent onward (e.g., using the "pub/sub" approach) to both Client 1 and Client 2. Both of those devices now generate visual indicia on the displays indicating that the desired program is scheduled to be recorded. Thus, both displays provide accurate information with a single message coming back from the remote network entities. Without the message server 303 in the CPE 106, two messages would be required to provide this same functionality.

FIGS. 7*a*-7*d* illustrate various implementations of an exemplary logical network architecture useful with message server and premises device of FIGS. 3 and 3*a*. As shown, the premises device in these embodiments includes a variety of logical processes and services with which the message server 302 communicates. In the illustrated embodiments, a Secure Web Sockets process 706 is utilized as the basis of the message server connection protocol. This process 706 communicates with the various other processes or services (whether within the CPE 106, or local within the premises yet outside of the CPE) in an event-driven manner via a pub/sub approach (i.e., the output of each process ("pub") feeds directly as inputs ("subs") to one or more next processes). The different processes may also be "chained", including with other devices within or associated with the premises (e.g., client rendering devices such as smart TVs or the like). Communications with external entities (e.g., remote/networked application servers) are conducted in the exemplary implementations shown using the aforementioned Representational State Transfer (REST) architectural constraints, although it will be appreciated that other approaches and architecture may be used consistent with the disclosure.

In one exemplary implementation (FIG. 7*b*), voice-based navigation, command and control of functions are implemented within the premises network via a voice client 714 with speech processing capability. A settop box (STB) client 712 is also a "sub" recipient of voice client inputs, and an intelligent home process or entity 708 communicates with the CPE 106 via the aforementioned RESTful architectural model (as does a third party cloud-based voice service 710, such as e.g., an MSO VoIP server or process). Each client is effectively decoupled with service implementations, and likewise the architecture is advantageously extensible to other clients and/or services.

In another implementation (FIG. 7*c*), a touch-enabled client (e.g., capacitive touch pad or the like) 722 is utilized, as well as a gesture recognition/feedback process 724. A remote (networked) data collection entity 726 subscribed to the Web Sockets process 706 receives touch and gesture data generated by the clients and utilizes it for e.g., correlation to products, services, or content displayed or advertised to the users at the premises (i.e., how a given user responds in terms of actions, gestures, etc. when shown a product in an advertisement, or a promotion for a given content element (e.g., movie or series episode).

Figure 7D:
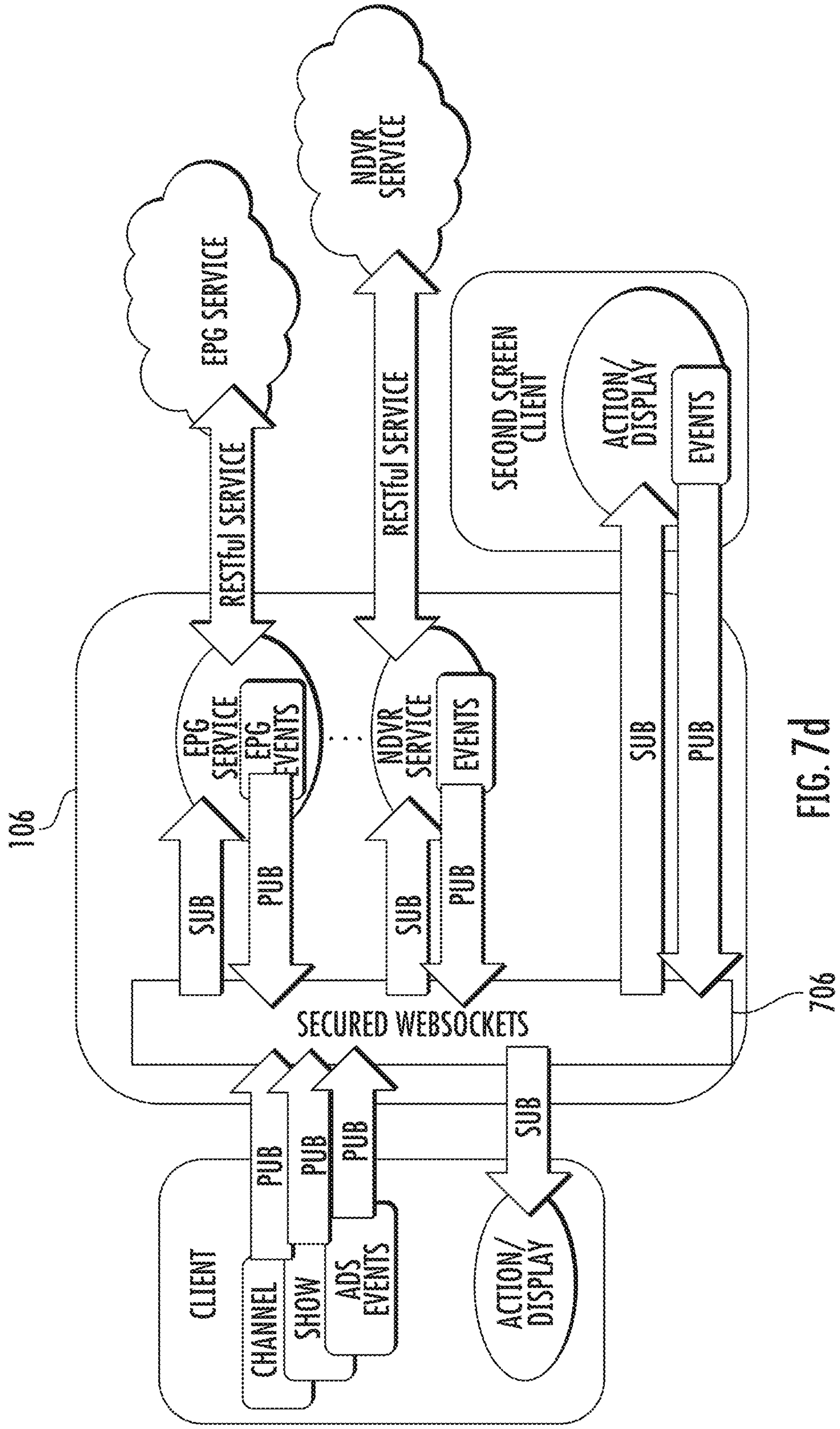

FIG. 7*d* illustrates yet another possible configuration of the premises gateway including RESTful communication with remote network DVR (nDVR) and electronic program guide (EPG) services associated with an MSO network.

It will also be recognized that while many of the foregoing embodiments are described in terms of "generation" of messages, the present disclosure contemplates that messages, when appropriately formatted, may simply be forwarded, or modified (contrast generation of a new message). For instance, a given message generated by a client device in the context of the method of FIG. 6 may already be suitable for receipt by the target (other) client device; the CPE message server process therefor need only read the appropriate portions of the message to e.g., determine routing, and route the message to the target client unchanged. Similarly, the same message generated by the initiating client may require one or more data elements be appended thereto before delivery, or one or more data elements (e.g., addresses) be "swapped out" by the message server process before forwarding. Hence, the term "generate" as used herein should be broadly interpreted to include any of the foregoing (i.e., forwarding unchanged, substitution of one or more elements, appending/removing one or more elements, and new generation/construction), as well as other possibilities.

Many other approaches and combinations of various operational and business paradigms are envisaged consistent with the present disclosure, as will be recognized by those of ordinary skill when provided this disclosure.

It will be recognized that while certain aspects of the present disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the ideas set forth herein. The foregoing description is of the best mode presently contemplated of carrying out the disclosure. This description is in no way meant to be limiting, but rather should be taken as illustrative of the general principles of. The scope of the disclosure should be determined with reference to the claims.

What is claimed is:

1. A computerized premises device for managing communications relating to a plurality of computerized client devices of a premises network, the computerized premises device comprising:

at least one data interface configured for data communication with the premises network, the premises network in data communication with at least the plurality of computerized client devices;

at least one backend interface configured for data communication with the plurality of computerized client devices;

a digital processor apparatus; and a storage apparatus in data communication with the digital processor apparatus and having at least one computer program disposed thereon, the at least one computer program configured to, when executed on the digital processor apparatus, cause the computerized premises device to:

receive data representative of a first message from a first computerized client device of the plurality of computerized client devices;

determine that the data representative of the first message is directed to one or more second computerized client devices of the plurality of computerized client devices;

generate data representative of at least one second message; and transmit the data representative of the at least one second message to the one or more second computerized client devices;

wherein the generating and the transmitting are performed within a messaging framework in which the computerized premises device maintains a single connection to an external application server and handles keep-alive messaging for a plurality of computerized client devices within the premises network.

2. The computerized premises device of claim 1, wherein the generation of the data representative of the at least one second message comprises generation of the data representative of the at least one second message in a format or protocol utilized by the one or more second computerized client devices, the format or protocol utilized by the one or more second computerized client devices being different than a format or protocol of the data representative of the first message.

3. The computerized premises device of claim 1, wherein:

the determination that the data representative of the first message is directed to the one or more second computerized client devices comprises a determination that the data representative of the first message is directed to two or more computerized client devices;

the generation of the data representative of the at least one second message comprises generation of data representative of at least two messages, the generation of the data representative of the at least two messages comprising replication of data from the data representative of the first message and generation of the data representative of the at least two messages via use of the replicated data; and the transmission of the data representative of the at least one second message to the one or more second computerized client devices comprises transmission of the data representative of the at least two messages containing the replicated data to the two or more computerized client devices, respectively.

4. The computerized premises device of claim 1, wherein:

the determination that the data representative of the first message is directed to the one or more second computerized client devices comprises access of a database of a plurality of network addresses associated with the plurality of computerized client devices; and the transmission of the data representative of the at least one second message to the one or more second computerized client devices comprises transmission of the data representative of the at least one second message to the one or more second computerized client devices based on one or more respective network addresses of the plurality of network addresses, the one or more respective network addresses respectively associated with the one or more second computerized client devices.

5. The computerized premises device of claim 1, wherein the at least one computer program is further configured to, when executed on the digital processor apparatus, cause the computerized premises device to:

encrypt the data representative of the at least one second message prior to transmission.

6. The computerized premises device of claim 1, wherein the transmission of the data representative of the at least one second message is performed using an Extensible Messaging and Presence Protocol (XMPP) over a secure WebSockets (WSS) connection.

7. The computerized premises device of claim 1, wherein the at least one computer program is further configured to, when executed on the digital processor apparatus, cause the computerized premises device to:

determine whether the one or more second computerized client devices are available based at least in part on a client device registry stored in the storage apparatus.

8. The computerized premises device of claim 1, wherein the data representative of the first message comprises a command message having control information for a target premises device.

9. The computerized premises device of claim 1, wherein the transmission of the data representative of the at least one second message bypasses a remote content or service provider network.

10. A computerized method of operating a premises network having a plurality of computerized client devices associated therewith, the computerized method comprising:

receiving, at a computerized premises device of the premises network, data representative of a first message from a first computerized client device of the plurality of computerized client devices;

determining that the data representative of the first message is directed to one or more second computerized client devices of the plurality of computerized client devices;

generating data representative of at least one second message; and utilizing at least one network address to transmit the data representative of the at least one second message to the one or more second computerized client devices via the premises network, without routing the data representative of the at least one second message outside of the premises network, the transmission comprising enabling the data representative of the at least one second message to bypass a long hairpin path by connecting the data representative of the at least one second message directly to the one or more second computerized client devices across the premises network.

11. The computerized method of claim 10, wherein determining that the data representative of the first message is directed to the one or more second computerized client devices comprises consulting a client device registry stored on the computerized premises device.

12. The computerized method of claim 10, wherein the data representative of the first message comprises control information associated with an appliance or media rendering operation.

13. The computerized method of claim 10, further comprising formatting the data representative of the at least one second message based at least in part on a messaging protocol supported by the one or more second computerized client devices.

14. The computerized method of claim 10, wherein the at least one network address comprises a local IPV6 address associated with the one or more second computerized client devices.

15. The computerized method of claim 10, wherein the data representative of the first message comprises data indicative of an event notification associated with a user interaction or device state change, and the data representative of the at least one second message comprises data indicative of an action directive responsive to the event.

16. Computer readable apparatus comprising a non-transitory storage medium, the non-transitory storage medium comprising at least one computer program having a plurality of instructions, the plurality of instructions configured to, when executed on a processing apparatus, cause a computerized premises apparatus to:

receive data representative of a first message from a first computerized client device of a premises network;

identify a second computerized client device of the premises network as a recipient of the first message based on at least one destination identifier within the data representative of the first message;

generate data representative of a second message, the data representative of the second message comprising data based at least in part on the first message; and transmit the second message to the second computerized client device over the premises network using an asynchronous protocol, the transmission of the second message comprising deferring transmission for a time period to enable aggregation of additional messages received within the premises network.

17. The computer readable apparatus of claim 16, wherein:

the plurality of instructions are further configured to, when executed on the processing apparatus, cause the computerized premises apparatus to:

determine a message format compatible with the second computerized client device, the determination comprising a selection between XMPP over WSS, RESTful JSON, or a proprietary binary format based on protocol support of the second computerized client device; and the generation of the second message comprises generation of the second message formatted in accordance with the determined message format.

18. The computer readable apparatus of claim 16, wherein the asynchronous protocol is selected from a group consisting of Extensible Messaging and Presence Protocol (XMPP), Message Queuing Telemetry Transport (MQTT), or Secure WebSockets (WSS).

19. The computer readable apparatus of claim 16, wherein the second computerized client device is associated with a specific role within the premises network, the specific role comprising at least one of: controller, sensor, media renderer, or input device.

20. The computer readable apparatus of claim 16, wherein the computerized premises apparatus comprises a multicast routing engine for distributing the second message to a plurality of second computerized client devices based on subscription records.

* * * * *